(12) United States Patent
Yoshizawa

(10) Patent No.: US 10,070,329 B2
(45) Date of Patent: Sep. 4, 2018

(54) DEVICE AND METHOD

(71) Applicant: SONY CORPORATION, Tokyo (JP)

(72) Inventor: Atsushi Yoshizawa, Kanagawa (JP)

(73) Assignee: SONY CORPORATION, Tokyo (JP)

(*) Notice: Subject to any disclaimer, the term of this patent is extended or adjusted under 35 U.S.C. 154(b) by 17 days.

(21) Appl. No.: 15/122,823

(22) PCT Filed: Feb. 12, 2015

(86) PCT No.: PCT/JP2015/053881
§ 371 (c)(1),
(2) Date: Aug. 31, 2016

(87) PCT Pub. No.: WO2015/146340
PCT Pub. Date: Oct. 1, 2015

(65) Prior Publication Data
US 2017/0070901 A1 Mar. 9, 2017

(30) Foreign Application Priority Data
Mar. 26, 2014 (JP) ................. 2014-063910

(51) Int. Cl.
H04W 4/00 (2018.01)
H04W 24/08 (2009.01)
H04W 16/14 (2009.01)
H04W 72/04 (2009.01)
H04W 84/12 (2009.01)

(52) U.S. Cl.
CPC ........... *H04W 24/08* (2013.01); *H04W 16/14* (2013.01); *H04W 72/042* (2013.01); *H04W 84/12* (2013.01)

(58) Field of Classification Search
USPC ........ 370/252, 393, 293, 330, 331, 333, 338
See application file for complete search history.

(56) References Cited

U.S. PATENT DOCUMENTS

2005/0094600 A1* 5/2005 Zhang ............... H04L 1/1887
370/331
2014/0038653 A1 2/2014 Mildh et al.

FOREIGN PATENT DOCUMENTS

| EP | 2 696 530 A2 | 2/2014 |
| WO | WO 2012/144941 A1 | 10/2012 |
| WO | WO 2013/179095 A1 | 12/2013 |

OTHER PUBLICATIONS

International Search Report dated May 12, 2015 in PCT/JP2015/053881 filed Feb. 12, 2015.
(Continued)

*Primary Examiner* — Zewdu A Beyen
(74) *Attorney, Agent, or Firm* — Oblon, McClelland, Maier & Neustadt, L.L.P.

(57) ABSTRACT

[Object] To make it possible to suppress a decrease in occasions on which a frequency band shared between a cellular system and a wireless LAN can be used in the wireless LAN.
[Solution] There is provided a device including an acquisition unit configured to acquire measurement information of a frequency band shared between a cellular system and a wireless local area network (LAN), the measurement information being provided by an access point of the wireless LAN, and a control unit configured to decide a time for which the frequency band is occupied for the cellular system based on the measurement information.

15 Claims, 17 Drawing Sheets

(56) References Cited

OTHER PUBLICATIONS

QUALCOMM, Ericsson, "Introducing LTE in Unlicensed Spectrum", 3GG TSG-RAN, vol. 62, RP-131635, (Dec. 3-7, 2013), <URL: http://www.3gpp.org/ftp/tsg_ran/TSG_RAN/TSGR_62/Docs/RP-131635.zip>, 8 pages.
S. Black, et al., "A Framework for RRM", IEEE, doc.: IEEE 802..11-03/080r0A, (Jan. 2003), <URL:https://mentor.ieee.org/802.11/don/03/11-03-0080-02-000k-a-framework-for-rrm.ppt >, 18 pages.
G. Venkatesan et al., Proposal Radio Resource Measurement Capability Enabled Bitmask IE, IEEE, doc. IEEE 802.11-07/2215r4, (Aug. 2007), <URL:https://mentor.ieee.org/802.11/don/07/11-07-2215-04-000k-supported-rrm-bitmask-submission.ppt >, 13 pages.
Huawei, Ericsson, QUALCOMM, CMCC, Verizon, "Summary of a Workshop on LTE in Unlicensed Spectrum", 3GPP TSG RAN Meeting #63, RP-140060, (Mar. 3-6, 2014). <URL:http://www.3gpp.org/ftp/tsg_ran/TSG_RAN/TSGR_63/Docs/RP-140060.zip >, 4 pages.
Extended European Search Report dated Oct. 25, 2017 in Patent Application No. 15769925.7, citing documents AO and AP therein, 8 pages.

\* cited by examiner

FIG. 4

| PROTOCOL VERSION | TYPE | SUB-TYPE | TO DS | FROM DS | MORE FRAGMENT | RETRY | POWER MANAGEMENT | MORE DATA | PROTECTED FRAME | ORDER |

DEVICE AND METHOD

TECHNICAL FIELD

The present technology relates to a device and a method.

BACKGROUND ART

The 3$^{rd}$ Generation Partnership Project (3GPP) has discussed various technologies that can improve system throughput. It can be said that expanding frequencies to be used is the easiest way to improve system throughput. The 3GPP has reviewed the technology called Carrier Aggregation (CA) in Release 10 and Release 11. CA is a technology of bundling component carriers (CCs) having a bandwidth of 20 MHz to be used to improve system throughput and a data rate to its maximum. In order to employ this CA technology, frequency bands that can be used as CCs are necessary. For this reason, additional frequency bands that can be used in wireless communication of a cellular system have been demanded.

A technology of sharing a frequency band has been proposed as the technology for using an additional frequency band. Patent Literature 1, for example, discloses a technology of controlling transmission parameters of transmission devices of different networks in cooperation with the networks to increase the sum of capacities of all the networks. In addition, Patent Literature 2 discloses a technology of avoiding temporally continuous interference in a primary system (a television broadcasting system) when a dedicated frequency band or the like allocated to the primary system is used by another system in a contention method.

CITATION LIST

Patent Literature

Patent Literature 1: JP 2010-075336A
Patent Literature 2: JP 2013-176015A

SUMMARY OF INVENTION

Technical Problem

A frequency band for a wireless local area network (LAN) being also used in a cellular system, for example, is considered. That is, a frequency band shared between a cellular system and a wireless LAN is considered. However, if the frequency band is used in the cellular system in the technologies disclosed in Patent Literatures 1 and 2, for example, occasions on which the frequency band can be used in the wireless LAN can remarkably decrease.

The technology disclosed in Patent Literature 1, for example, is based on the premise that the devices of the different networks can be controlled in a centralized manner. However, since devices autonomously operate in the contention method on a general wireless LAN, it is difficult to apply the technology disclosed in Patent Literature 1 to such a case in which a frequency band is shared between a cellular system and a wireless LAN. Thus, there also is a possibility of, for example, the frequency band being used in the cellular system, and as a result, occasions on which it is not possible to use the frequency band in a wireless LAN device (an access point or a station) in order to avoid collisions remarkably increasing. That is, occasions on which it is possible to use the frequency band in the wireless LAN can be remarkably reduced.

In addition, the technology disclosed in Patent Literature 2 enables temporally continuous interference in a primary system (a television broadcasting system) to be avoided when, for example, a frequency band (or a contiguous frequency band) of the primary system is used in another system. Thus, when a frequency band of a wireless LAN is also used in a cellular system, there is a possibility of temporally continuous interference in the wireless LAN being avoided according to the technology disclosed in Patent Literature 2. However, there still is a possibility of occasions on which it is possible to use the frequency band in the wireless LAN remarkably decreasing.

Therefore, it is desirable to provide a mechanism in which a decrease in occasions on which a frequency band shared between a cellular system and a wireless LAN can be used in the wireless LAN can be suppressed.

Solution to Problem

According to the present disclosure, there is provided a device including an acquisition unit configured to acquire measurement information of a frequency band shared between a cellular system and a wireless local area network (LAN), the measurement information being provided by an access point of the wireless LAN, and a control unit configured to decide a time for which the frequency band is occupied for the cellular system based on the measurement information.

According to the present disclosure, there is provided a method including: acquiring measurement information of a frequency band shared between a cellular system and a wireless LAN, the measurement information being provided by an access point of the wireless LAN; and deciding, by a processor, a time for which the frequency band is occupied for the cellular system based on the measurement information.

According to the present disclosure, there is provided a device including: an acquisition unit configured to acquire measurement information of a frequency band shared between a cellular system and a wireless LAN, the measurement information being generated by a wireless LAN device; and a providing unit configured to provide the measurement information to a base station of the cellular system.

According to the present disclosure, there is provided a method including: acquiring measurement information of a frequency band shared between a cellular system and a wireless LAN, the measurement information being generated by a wireless LAN device; and providing, by a processor, the measurement information to a base station of the cellular system.

Advantageous Effects of Invention

According to the present disclosure as described above, it is possible to suppress a decrease in occasions on which a frequency band shared between a cellular system and a wireless LAN can be used in the wireless LAN. Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 4 is an illustrative diagram for describing a frame control field in detail.

DESCRIPTION OF EMBODIMENT(S)

Hereinafter, preferred embodiments of the present disclosure will be described in detail with reference to the appended drawings. In this specification and the drawings, elements that have substantially the same function and structure are denoted with the same reference signs, and repeated explanation is omitted.

Note that description will be provided in the following order.

1. Introduction
2. Schematic configuration of a communication system
3. Configuration of each device
   3.1. Configuration of a base station
   3.2. Configuration of an access point
4. Process flow
5. Modified example
6. Application examples
7. Conclusion 1. <<Introduction>>

First, technologies with regard to a wireless LAN will be described with reference to FIGS. 1 to 4.

(Access Method)

The access method of IEEE 802.11 includes two methods that are a distributed coordination function (DCF) method and a point coordination function (PCF) method. The DCF is a method of contending for the access right within a basic service set (BSS) according to a given rule. On the other hand, the PCF is a method of controlling the access right within a BSS in a centralized manner. Generally, the DCF has become widespread as an access method in wireless LANs.

(a) CSMA/CA

In the DCF, Carrier Sense Multiple Access/Collision Avoidance (CSMA/CA) is used. The mechanism of CSMA/CA will be described below with reference to FIG. 1.

Figure 1:
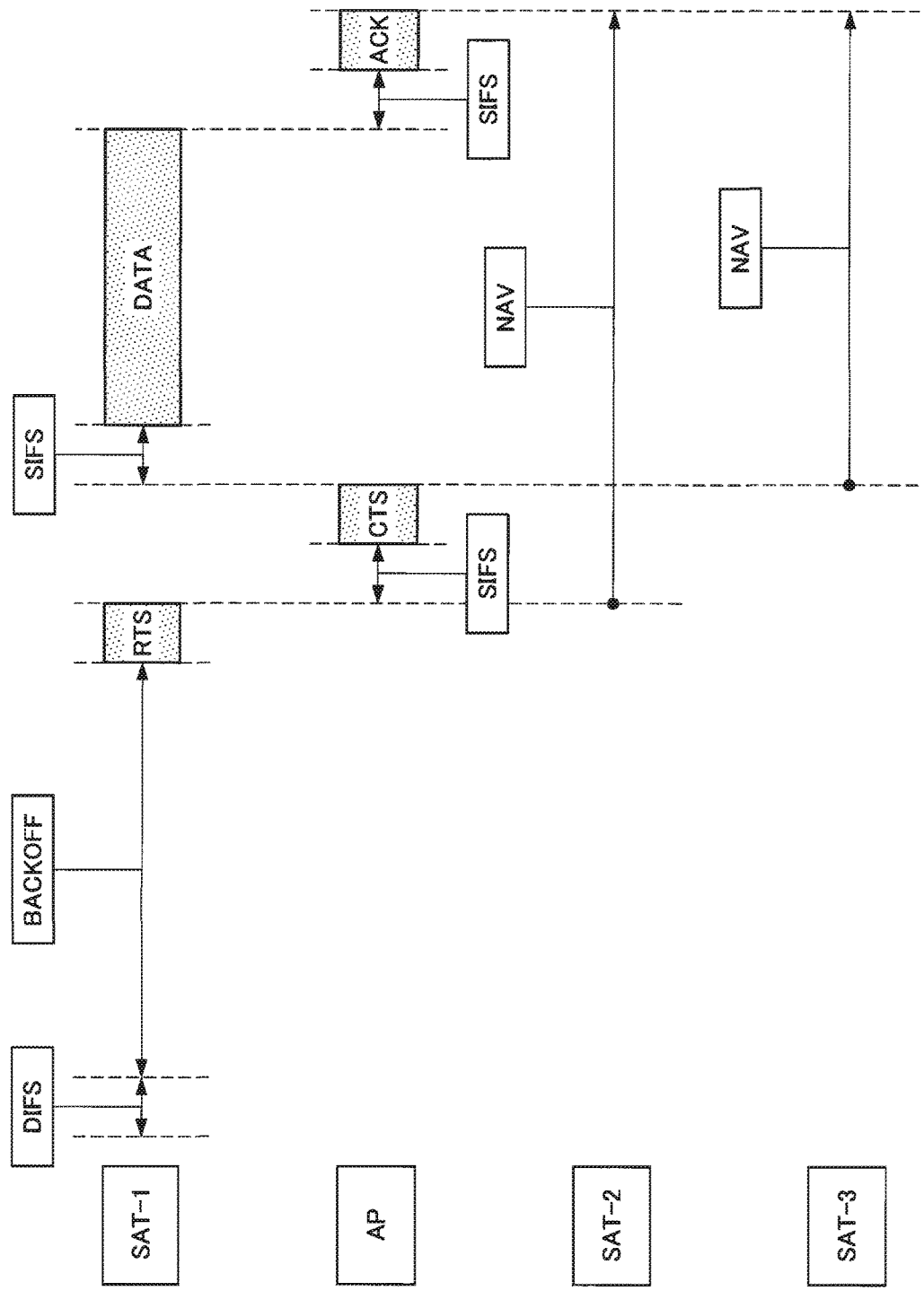
FIG. 1 is an illustrative diagram for describing the mechanism of CSMA/CA.

FIG. 1 is an illustrative diagram for describing the mechanism of CSMA/CA. Referring to FIG. 1, stations 1 to 3 (STA-1 to 3) and an access point (AP) are shown. In this example, the STA transmits data to the AP. The STA-2 is positioned within the communication range of the STA-1. The STA-3 is not positioned within the communication range of the STA-1, but is positioned within the communication range of the AP. The STA-1 ascertains that a signal has not been transmitted for a duration called DCF Inter Frame Spacing (DIFS) after the end of a busy period. Thereafter, the STA-1 further stands by for a backoff time that is randomly set for each terminal device, and if a signal is not transmitted during the backoff time either, it transmits a Request To Send (RTS) frame. Then, the AP and the STA-2 receive the RTS frame. The STA-2 acquires a value to be included in a duration field of the RTS frame according to the reception of the RTS frame, and sets the value as a network allocation vector (NAV). Then, the STA-2 holds the signal through a period until transmission of an ACK frame by the AP ends. According to the reception of the RTS frame, the AP transmits a Clear To Send (CTS) frame a Short InterFrame Space (SIFS) after the end of the RTS frame. Then, the STA-1 and STA-3 receive the CTS frame. The STA-3 acquires a value to be included in a duration field of the CTS frame according to the reception of the CTS frame, and sets the value as an NAV. Then, the STA-2 holds a signal through the period until transmission of an ACK frame by the AP ends. The STA-1 transmits a data frame to the AP an SIFS after the end of the CTS frame according to the reception of the CTS frame. Then, the AP transmits the ACK frame to the STA-1 the SIFS after the end of the data frame. In this manner, while the STA-1 transmits data to the AP, the STA-2 and STA-3 hold transmission of a signal, and thus collisions can be avoided.

Note that the backoff time mentioned above is the time obtained by multiplying an integer value randomly selected from values between a contention window (CW) value of the STA-1 and 1 by a slot time. The CW value has the minimum value as its initial value, has next higher values each time re-transmission is performed with no ACK received thereafter, and is used as a parameter for the calculation of the backoff time.

In addition, the DIFS is the sum of twice the slot time and the SIFS.

The maximum and minimum values of the CW value, the SIFS, the slot time, and the DIFS according to the standards of the IEEE 802.11 Series are as follows.

TABLE 1

|  | 802.11b | 802.11g | 802.11a | 802.11n | 802.11ac |
|---|---|---|---|---|---|
| CWmin | 31 | 15 | 15 | 15 | 15 |
| CWmax | 1023 | 1023 | 1023 | 1023 | 1023 |
| SIFS | 10 us | 10 us | 16 us | 16 us | 16 us |
| Slot time | 20 us | 9 us | 9 us | 9 us | 9 us |
| DIFS | 50 us | 28 us | 34 us | 34 us | 34 us |

(b) Constitution of Frames

A constitution of the RTS frame and a constitution of the CTS frame will be described below with reference to FIGS. 2 to 4.

Figure 2:
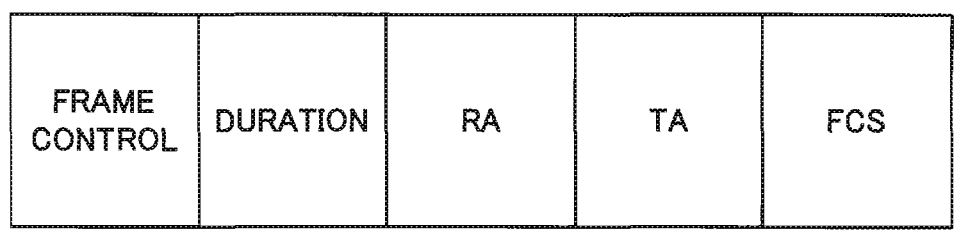
FIG. 2 is an illustrative diagram for describing a constitution of an RTS frame.

FIG. 2 is an illustrative diagram for describing the constitution of the RTS frame. Referring to FIG. 2, the RTS frame includes a frame control field, a duration field, a reception address (RA) field, a transmission address (TA) field, and a frame check sequence (FCS). The frame control field includes control information as will be described later. The duration field includes a value indicating a time from the end of transmission of the RTS frame to the end of transmission of the ACK frame (that is, the time of the sum of 3 SIFSs, the length of the CTS frame, the length of the data frame, and the length of the ACK frame). A device receiving the RTS frame can set the value as, for example, an NAV. The reception address field includes the MAC address of a terminal that is the destination of the RTS frame, and the transmission address field includes the MAC address of a terminal that is the transmission source of the RTS frame. The FCS is a sequence for checking frame data.

Figure 3:
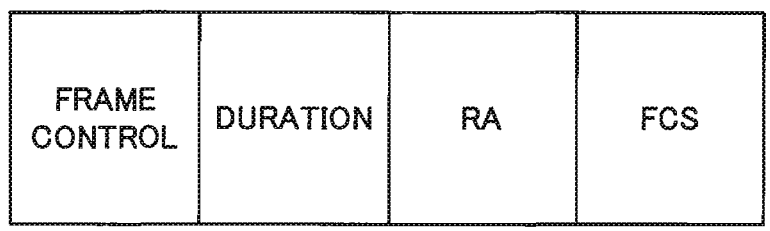
FIG. 3 is an illustrative diagram for describing a constitution of a CTS frame.

FIG. 3 is an illustrative diagram for describing the constitution of the CTS frame. Referring to FIG. 3, the CTS frame includes a frame control field, a duration field, a reception address field, and an FCS. The frame control field includes control information as will be described below. The duration field includes a value indicating the time from the end of transmission of the CTS frame to the end of transmission of the ACK frame (that is, the time of the sum of 2 SIFSs, the length of the data frame, and the length of the ACK frame). The value is the value obtained by subtracting the sum of the length of the CTS frame and the SIFSs from the value included in the duration field of the RTS frame. A device receiving the CTS frame can set the value as an NAV. The reception address field includes the MAC address of a terminal that is a destination of the CTS frame. The FCS is a sequence for checking frame data. Note that a constitution of the ACK frame is similar to the constitution of the CTS frame.

FIG. 4 is an illustrative diagram for describing a frame control field in detail. A protocol version field normally includes 0, indicating that protocol of IEEE 802.11 is being used. A type field includes a value indicating the type of frame. The value is 00 in the case of a management frame, 01 in the case of a control frame, and 10 in the case of a data frame. Since the RTS frame and the CTS frame are control frames, 01 is included therein. In addition, a sub-type field includes a value indicating a more detailed type. The sub-type field of the RTS frame includes 1011, and the sub-type field of the CTS frame includes 1100. A To DS field includes a value indicating whether the frame is a frame from an STA to the AP or a frame from the AP to an STA. A more fragment field includes a value indicating a fragment of data. A retry field includes a value indicating whether transmission of the frame is re-transmission, and the value of 1 indicates that transmission of the frame is re-transmission. A power management field includes a value indicating whether an STA is in a power save mode. The value of 1 indicates that an STA is in the power save mode. A more data field includes a value indicating whether transmission data with respect to an STA in the power save mode is in the AP. A protected frame field includes a value indicating whether MAC service data unit (SDU) data is encrypted.

(Beacon)

In an infrastructure mode, the AP normally transmits beacons per 100 ms. A beacon includes parameters necessary for a station (STA) (for example, an encryption method, a transmission rate, a service set identifier (SSID), and the like of the access point (AP)). The coverage of the beacon is equivalent to the service range of the AP.

In addition, beacons include a deliver traffic information message (DTIM) at a given interval. The DTIM informs a station of the fact that there is data destined for the station. The given interval is called a DTIM interval. An STA in the power save mode wakes up immediately before the timing of the DTIM, and when it finds out that the AP has data in its buffer, for example, the STA transmits a power saving poll (PS-Poll) frame to receive the data. Note that, when the AP has no data in its buffer, the STA that was in the power save mode returns to the power save mode again.

(Measurement)

IEEE 802.11 stipulates radio resource management (RRM) of wireless LANs. In more detail, it is described in the literature "IEEE Standard for Information Technology—Telecommunications and Information Exchange between Systems—Local and Metropolitan Area Networks—Specific Requirements, Part 11: Wireless LAN Medium Access Control (MAC) and Physical Layer (PHY) Specifications, Amendment 1: Radio Resource Measurement of Wireless LANs."

The STA performs, for example, measurement of a channel of a wireless LAN according to a request of the AP, and provides a report regarding the channel to the AP. In addition, the STA can request a report regarding a channel of a wireless LAN from another STA. In addition, the STA can perform measurement on a channel of a wireless LAN according to a request made by another STA.

As the measurement information, there are a channel load report, a noise histogram report, a beacon report, a frame report, an STA statistic report, a location configuration information report, a transmit stream/category measurement report, a neighbor report, and the like.

First, the channel load report is a report on a channel use rate, and includes a channel load reference value. The channel load reference value is any value from 0 to 255, and 255 is the maximum (100%). The channel load reference value is proportional to a rate at which a channel is busy.

Second, the noise histogram report is a report on noise from a terminal that does not comply with IEEE 802.11, and includes an idle power indicator (IPI) density value of a time when a channel is idle.

Third, the beacon report is a report on a beacon frame transmitted from another access point, and includes a received channel power indicator (RCPI), a beacon interval, and the like of the beacon frame.

Fourth, the frame report is a report on frames transmitted from another device, and includes the address, the number of frames, an RCPI, and the like of each transmission source.

Fifth, the STA statistic report is a report on statistics of reception quality of data frames, and includes the number of reception failures, the number of re-transmissions, the number of overlapping frames, the number of multicast frames, the number of error detection failures, and the like.

Sixth, the location configuration information report is a report on location information of a terminal, and includes the latitude, longitude, altitude, and the like of the terminal.

Seventh, the transmit stream/category measurement report is a report on quality information of quality-of-service (QoS) transmission.

Eighth, the neighbor report is a report on information of a contiguous access point.

2. <<Configuration of a Communication System>>

Figure 5:
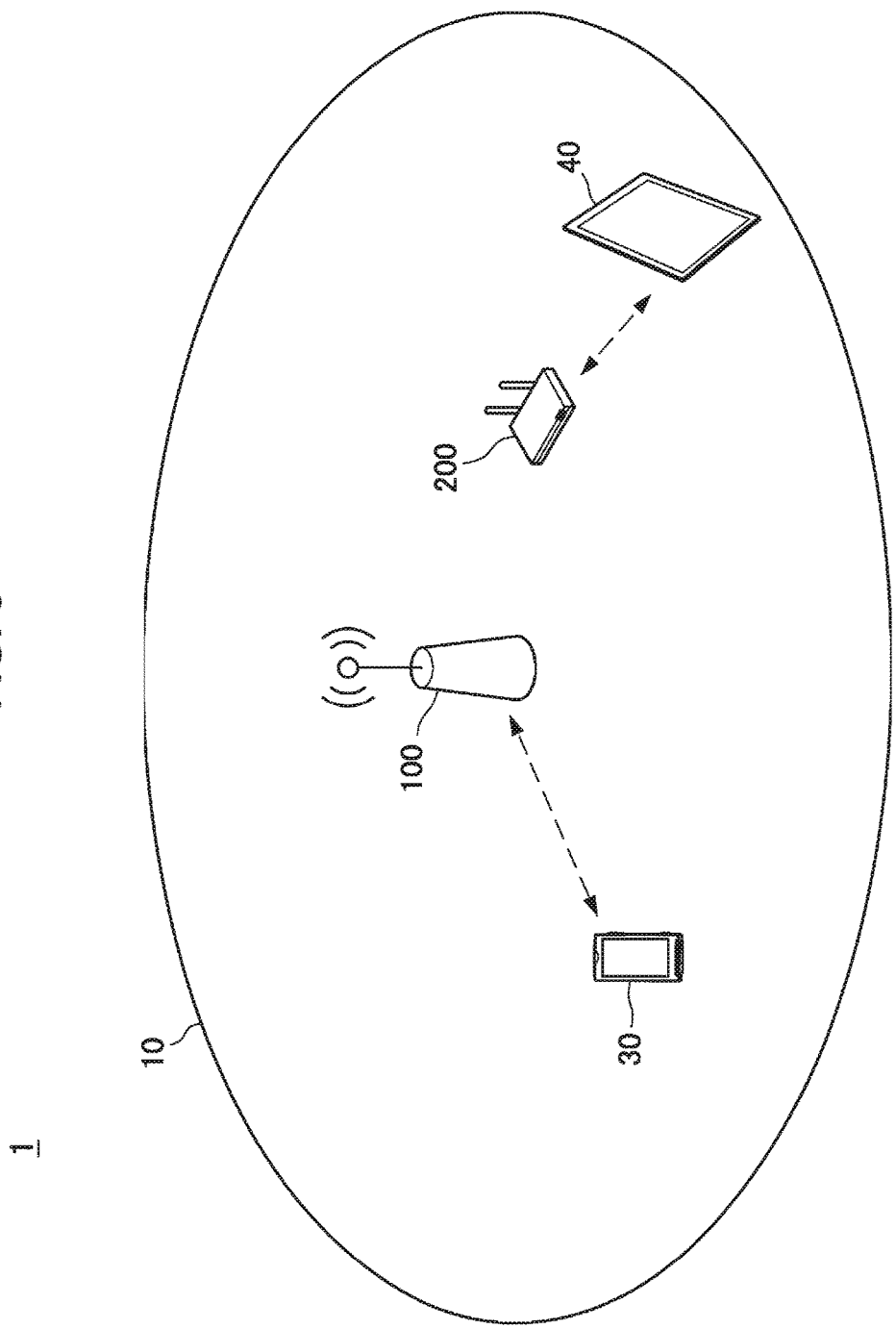
FIG. 5 is an illustrative diagram showing an example of a schematic configuration of a communication system according to an embodiment.

First, a schematic configuration of a communication system 1 according to an embodiment of the present disclosure will be described with reference to FIGS. 5 and 6. FIG. 5 is an illustrative diagram showing an example of the schematic configuration of the communication system 1 according to the present embodiment. Referring to FIG. 5, the communication system 1 includes a base station 100, an access point 200, a cellular terminal 30, and a wireless LAN terminal 40.

(Base Station 100)

The base station 100 is a base station of a cellular system. The cellular system complies with a cellular system communication standard, and the base station 100 performs wireless communication complying with the communication standard (which will be referred to as "cellular communication" hereinbelow). The communication standard is, for example, a communication standard of the 3$^{rd}$ Generation Partnership Project (3GPP). More specifically, the communication standard is, for example, LTE, LTE-Advanced, or a communication standard equivalent thereto.

The base station 100 performs cellular communication with the cellular terminal 30. For example, the base station 100 performs cellular communication with the cellular terminal 30 positioned within a cell 10 that is the communication area of the base station 100. Specifically, for example, the base station 100 transmits downlink signals to the cellular terminal 30, and receives uplink signals from the cellular terminal 30.

In addition, the base station 100 communicates with the access point 200. The base station 100, for example, performs wireless communication with the access point 200. More specifically, the base station 100, for example, performs wireless communication with the access point 200 complying with a wireless LAN standard (which will be referred to as "wireless LAN communication" hereinbelow). The wireless LAN standard is, for example, one standard of IEEE 802.11 Releases (IEEE 802.11a, 11b, 11g, 11n, 11ac, 11ad, and the like). Note that the base station 100 may communicate with the access point 200 via backhaul.

As an example, the base station 100 is a small base station, and the cell 10 is a small cell. As another example, the base station 100 may be a macro base station, and the cell 10 may be a macrocell.

(Cellular Terminal 30)

The cellular terminal 30 is a terminal that can communicate in the cellular system. The cellular terminal 30 performs cellular communication with the base station 100. For example, the cellular terminal 30 performs cellular communication with the base station 100 when positioned within the cell 10. Specifically, for example, the cellular terminal 30 receives downlink signals from the base station 100, and transmits uplink signals to the base station 100.

(Access Point 200)

The access point 200 is an access point of a wireless LAN. The access point 200 performs wireless communication complying with a wireless LAN standard (that is, wireless LAN communication). The wireless LAN standard is, for example, one standard of IEEE 802.11 Releases.

The access point 200 performs wireless LAN communication with the wireless LAN terminal 40. For example, the access point 200 performs wireless LAN communication with the wireless LAN terminal 40 positioned within the communication area of the access point 200. Specifically, for example, the access point 200 transmits signals to the wireless LAN terminal 40, and receives signals from the wireless LAN terminal 40.

Furthermore, the access point 200 communicates with the base station 100. For example, the access point 200 performs wireless communication with the base station 100. More specifically, for example, the access point 200 performs wireless LAN communication with the base station 100. Note that the access point 200 may communicate with the base station 100 via backhaul.

(Wireless LAN Terminal 40)

The wireless LAN terminal 40 is a terminal that can communicate on the wireless LAN. The wireless LAN terminal 40 can be called a station. The wireless LAN terminal 40 performs wireless LAN communication with the access point 200. The wireless LAN terminal 40 performs wireless LAN communication with the access point 200 when, for example, positioned within the communication area of the access point 200. Specifically, for example, the wireless LAN terminal 40 transmits signals to the access point 200, and receives signals from the access point 200.

(Frequency Bands to be Used)

(a) Cellular Band

In the cellular system, a frequency band for the cellular system (which will be referred to as a "cellular band" hereinbelow) is used. The cellular band is, for example, component carriers (CCs) of a band assigned to the provider of the cellular system (which will also be referred to as a licensed band).

(b) Shared Band

Particularly in the present embodiment, a frequency band of a wireless LAN is also used in the cellular system. That is, in the cellular system, a frequency band shared between the cellular system and the wireless LAN (referred to as a "shared band" hereinbelow) is also used. The shared band is, for example, a channel of a wireless LAN. As an example, the shared band is a channel of 20 MHz. The channel may be a channel of a 2.4 GHz band, or a channel of a 5 GMz band. Note that, in the cellular system, only one shared band may be used, or 2 or more shared bands may be used.

A duplex method of the cellular system is, for example, Frequency Division Duplex (FDD). In this case, the shared band is used as, for example, a downlink band. As an example, all or a part of the shared band is used as downlink component carriers (CCs). A specific example of this subject will be described below with reference to FIG. 6.

Figure 6:
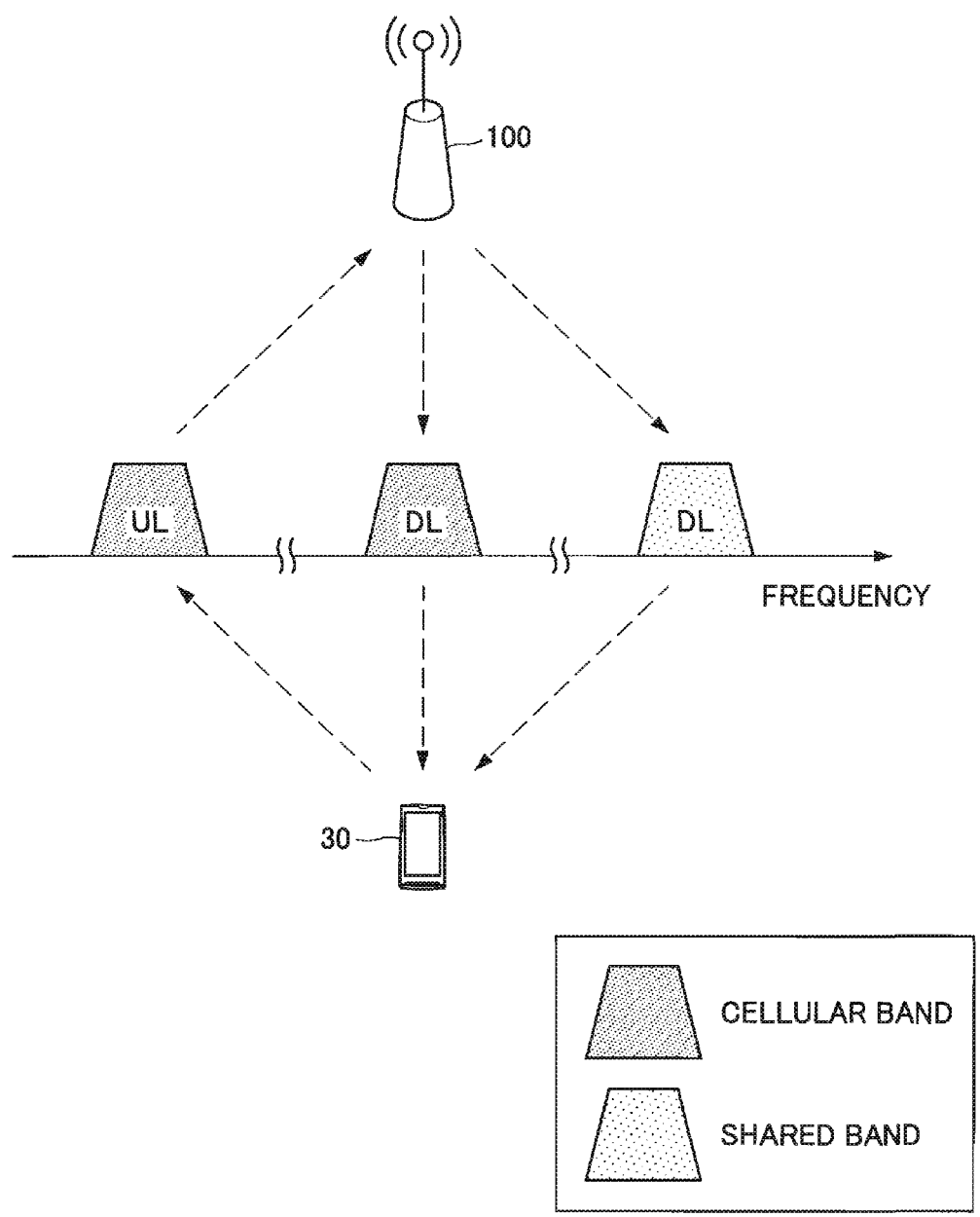
FIG. 6 is an illustrative diagram for describing an example of a use of a shared band in a cellular system.

FIG. 6 is an illustrative diagram for describing an example of a use of a shared band in a cellular system. Referring to FIG. 6, the base station 100 and the cellular terminal 30 are shown. In addition, two cellular bands and one shared band used in cellular communication of the base station 100 and the cellular terminal 30 are shown. In this example, the one shared band is used as a downlink CC. One of the two cellular bands is an uplink CC, and the other of the two cellular bands is a downlink CC.

Note that all or a part of the shared band may be used as an uplink band. As an example, all or a part of the shared band may be used as an uplink CC. In addition, a part of the shared band may be used as an uplink CC, and the remaining part of the shared band may be used as a downlink CC. Alternatively, a shared band may be used as an uplink CC, and another shared band may be used as a downlink CC.

Alternatively, the duplex method of the cellular system may be Time Division Duplex (TDD), and the shared band may be used as a downlink and uplink band.

The communication system 1 according to the embodiment of the present disclosure has been described above. Note that, rather than only one access point 200, two or more access points 200 may of course be positioned in the periphery of the base station 100.

3. <<Configuration of Each Device>>

Next, configurations of the base station 100 and the access point 200 according to the embodiment of the present disclosure will be described with reference to FIGS. 7 to 11.

3.1. <Configuration of a Base Station>

Figure 7:
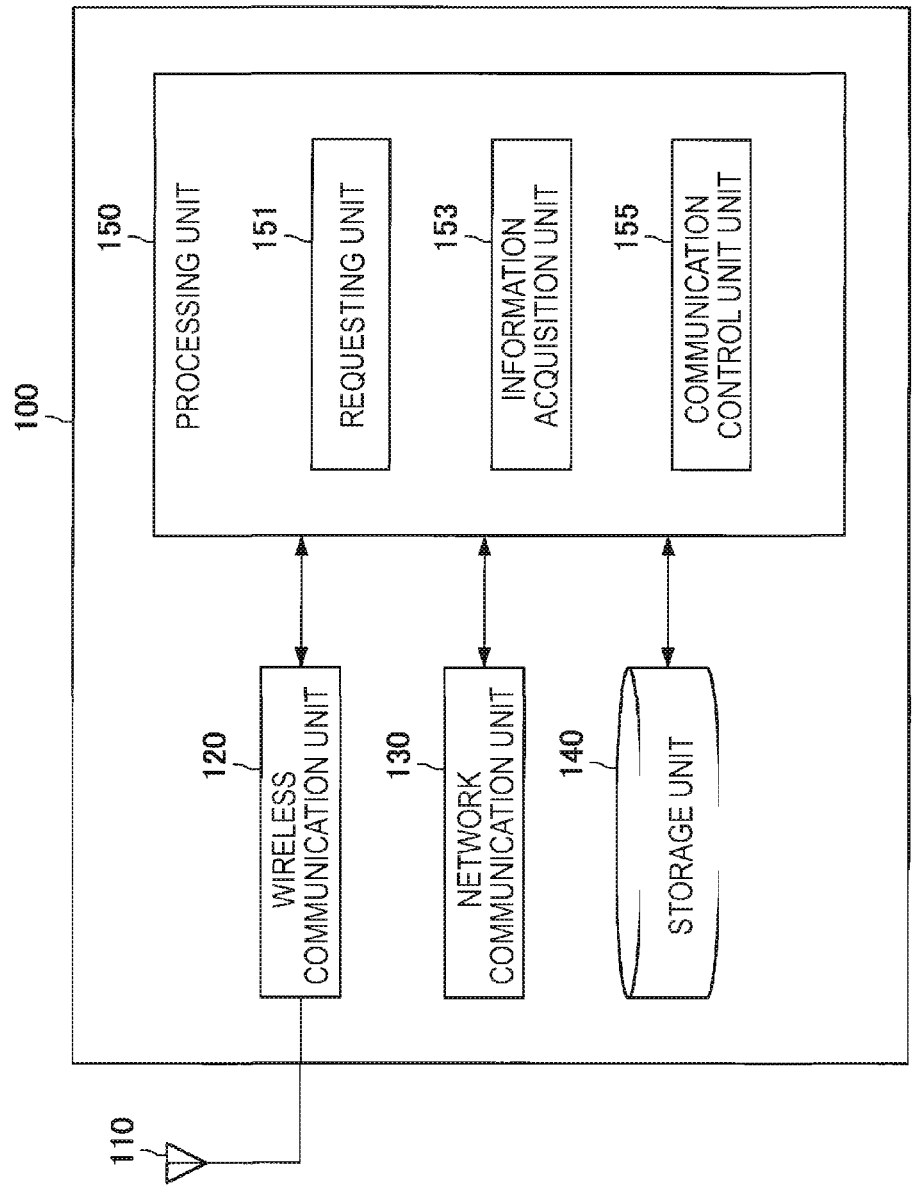
FIG. 7 is a block diagram showing an example of a configuration of a base station according to the same embodiment.

First, an example of a configuration of the base station 100 according to the embodiment of the present disclosure will be described with reference to FIGS. 7 to 10. FIG. 7 is a block diagram showing the example of the configuration of the base station 100 according to the embodiment of the present disclosure. Referring to FIG. 7, the base station 100 includes an antenna unit 110, a wireless communication unit 120, a network communication unit 130, a storage unit 140, and a processing unit 150.

(Antenna Unit 110)

The antenna unit 110 radiates signals output by the wireless communication unit 120 to a space as radio waves. In addition, the antenna unit 110 converts radio waves from a space into signals, and outputs the signals to the wireless communication unit 120.

(Wireless Communication Unit 120)

(a) Cellular Communication

The wireless communication unit 120 transmits and receives signals of cellular communication. For example, the wireless communication unit 120 transmits downlink signals to the cellular terminal 30 positioned within the cell 10, and receives uplink signals from the cellular terminal 30 positioned within the cell 10.

The wireless communication unit 120 transmits and receives, for example, signals of cellular communication using a cellular band. In addition, particularly in the embodiment of the present disclosure, the wireless communication unit 120 transmits and receives signals of cellular communication using a shared band.

(b) Wireless LAN Communication

The wireless communication unit 120 transmits and receives, for example, signals of wireless LAN communication. For example, the wireless communication unit 120 transmits signals to the access point 200, and receives signals from the access point 200. For example, the wireless communication unit 120 transmits and receives signals of wireless LAN communication using a shared band.

(Network Communication Unit 130)

The network communication unit 130 communicates with other nodes. For example, the network communication unit 130 communicates with a core network node (for example, a mobility management entity (MME), a serving gateway (S-GW), a packet data network gateway (P-GW), and the like). In addition, the network communication unit 130, for example, may communicate with the access point 200 via backhaul.

(Storage Unit 140)

The storage unit 140 temporarily or permanently stores programs and data for operations of the base station 100.

(Processing Unit 150)

The processing unit 150 provides various functions of the base station 100. The processing unit 150 includes a requesting unit 151, an information acquisition unit 153, and a communication control unit 155. Note that the processing unit 150 can further include a constituent element other than these constituent elements. That is, the processing unit 150 can also perform an operation other than the operations of these constituent elements.

(Requesting Unit 151)

The requesting unit 151 requests measurement information of a frequency band shared between the cellular system and the wireless LAN (that is, a shared band) from the access point 200.

(a) Management Information

The management information is, for example, a report complying with IEEE 802.11k or information generated based on the report. Specifically, for example, the report includes one or more reports among a channel load report, a noise histogram report, a beacon report, a frame report, an STA statistic report, a location configuration information report, a transmit stream/category measurement report, and a neighbor report.

The base station 100 can ascertain, for example, a state of wireless LAN communication in a peripheral environment according to such measurement information.

(b) Access Point

Access Point Having a Capability

The access point 200 (that is, the access point 200 from which the requesting unit 151 requests the measurement information) is, for example, an access point having a capability of RRM of IEEE 802.11k. That is, the access point 200 is an access point that transmits beacons including a radio resource management (RRM) capability information element (IE).

The base station 100, for example, receives one or more beacons transmitted from one or more access points 200 positioned in the periphery of the base station 100, and the processing unit 150 (for example, the communication control unit 155) checks whether each of the one or more beacons has the RRM capability IE. Then, the processing unit 150 (for example, the communication control unit 155) selects the access point 200 that transmitted the beacon including the RRM capability IE among the one or more access points. Thereafter, the requesting unit 151 requests the measurement information from the selected access point 200.

Access Point Selected Based on Reception Power of a Beacon

The access point (that is, the access point 200 from which the requesting unit 151 requests the measurement information) is, for example, an access point selected based on reception power of the one or more received beacons.

The processing unit 150 (for example, the communication control unit 155), for example, selects one access point that transmitted the beacon entailing the maximum reception power among one or more access points 200 that transmitted beacons including the RRM capability IE. Then, the requesting unit 151 requests the measurement information from the one selected access point.

Accordingly, for example, it is possible to acquire the measurement information from the access point closest to the base station 100.

The access point 200 from which the requesting unit 151 requests the measurement information has been described above. Note that the requesting unit 151 may request the measurement information from only one access point 200, or may request the measurement information from two or more access points 200.

(c) Specific Technique

The requesting unit 151 requests the measurement information from the access point 200 through, for example, wireless LAN communication. More specifically, for example, the requesting unit 151 transmits a frame for requesting the measurement information to the access point 200 via the wireless communication unit 120.

Alternatively, the requesting unit 151 may request the measurement information from the access point 200 through communication via backhaul, rather than via the wireless LAN communication. More specifically, the requesting unit 151 may transmit a message requesting the measurement information to the access point 200 via the network communication unit 130.

As described above, the measurement information is requested from the access point 200. Accordingly, for example, the base station 100 can acquire the measurement information when necessary.

Note that the requesting unit 151 makes the request as described above only when the base station 100 receives a beacon transmitted from an access point having a capability of RRM of IEEE 802.11k.

In addition, the requesting unit 151 makes the request as described above when a predetermined condition for a reception state of the beacon transmitted from the access point 200 is not satisfied. Note that the predetermined condition will be described below.

(Information Acquisition Unit 153)

The information acquisition unit 153 acquires measurement information of a shared band provided by the access point 200.

For example, when the requesting unit 151 requests the measurement result of the shared band from the access point 200 as described above, for example, the access point 200 provides the measurement result of the shared band to the base station 100. Then, the measurement result is stored in the storage unit 140. At any timing thereafter, the information acquisition unit 153 acquires the measurement information.

Note that the measurement information is, for example, a report complying with IEEE 802.11k or information generated based on the report as described above. Specifically, for example, the report includes one or more reports of a channel load report, a noise histogram report, a beacon report, a frame report, an STA statistic report, a location configuration information report, a transmit stream/category measurement report, and a neighbor report.

(Communication Control Unit 155)

(a) Decision on an Occupancy Time of a Shared Band

The communication control unit 155 decides the time for which the shared band is occupied for the cellular system.

For example, the communication control unit 155 decides an occupancy time of the shared band for the cellular system. The occupancy time may be a time for which the shared band is actually occupied, or may be an upper limit time for which the shared band can be occupied.

Alternatively, the communication control unit 155 may decide a time occupancy rate of the shared band for the cellular system, instead of or in addition to the occupancy time. The time occupancy rate may be, for example, a ratio of time at which the shared band is actually occupied, or an upper ratio of time at which the shared band can be occupied.

(a-1) Decision Based on a Reception State of Beacons

The communication control unit 155, for example, decides the time for which the shared band is occupied for the cellular system based on a reception state of beacons transmitted from the access point of the wireless LAN.

Accordingly, the time for which the shared band is occupied can be decided in consideration of, for example, an arrangement state of the access point of the wireless LAN in the periphery of the base station 100. Thus, a decrease in occasions on which the shared band can be used in the wireless LAN can be suppressed.

Specific Technique

When the predetermined condition for the reception state of the beacons is satisfied, for example, the communication control unit 155 can decide to occupy the shared band for a longer time than when the predetermined condition is not satisfied.

For example, the predetermined condition is that reception power of all beacons transmitted from the access point of the wireless LAN is less than a predetermined threshold value. That is, when reception power of all beacons transmitted from the access point of the wireless LAN is less than the predetermined threshold value, the communication control unit 155 decides to occupy the shared band for a longer time than when reception power of any beacon is equal to or greater than the predetermined threshold value.

As an example, if reception power of all beacons of the base station 100 is less than the predetermined threshold value, the communication control unit 155 decides to occupy the shared band for the cellular system for a predetermined longest occupancy time (or at a predetermined highest time occupancy rate). On the other hand, if reception power of any beacon of the base station 100 is equal to or greater than the predetermined threshold value, the communication control unit 155 decides to occupy the shared band for the cellular system for a shorter time than the predetermined longest occupancy time (or at a lower time occupancy rate than the predetermined highest time occupancy rate).

Accordingly, when there is no access point of the wireless LAN near the base station 100, for example, the shared band for the cellular system can be occupied for a long time. That is, the shared band for the cellular system can be occupied for a long time without causing a decrease in occasions on which the shared band can be used in the wireless LAN.

Note that the predetermined condition may of course be that reception power of all beacons transmitted from the access point of the wireless LAN is equal to or lower than the predetermined threshold value.

Flow to Decision

The processing unit 150, for example, measures the reception power of the beacons received by the base station 100 for a fixed period of time. For example, beacons are normally transmitted at a cycle of about 100 milliseconds (ms), and thus the fixed period of time is time equal to or longer than 100 ms. Because there is an access point that transmits beacons at a cycle longer than 100 ms, the fixed period of time may be about 1 second (s). In addition, the fixed period of time may be appropriately changed.

Furthermore, the processing unit 150 (for example, the communication control unit 155) determines whether reception power of all beacons that are received for the fixed period of time is less than the predetermined threshold value. If the reception power of all the beacons is less than the predetermined threshold value, the communication control unit 155 decides to occupy the shared band for the cellular system for the predetermined longest occupancy time (or at the predetermined highest time occupancy rate).

Note that the above-described process can be performed at a relatively long cycle.

(a-2) Decision Based on Measurement Information

Particularly in the embodiment of the present disclosure, the communication control unit 155 decides a time for which the shared band is occupied for the cellular system based on the measurement information (acquired by the information acquisition unit 153).

Specific Technique

For example, the communication control unit 155 decides to occupy the shared band for the cellular system for the time according to parameters included in the measurement information. Specifically, for example, the communication control unit 155 decides an occupancy time (or a time occupancy rate) according to the parameters included in the measurement information.

As an example, the measurement information includes a channel load report, and the parameters include a channel load reference value. In this case, if the channel load reference value is less than a predetermined threshold value, the communication control unit 155 decides a longer occupancy time (or a higher time occupancy rate), and if the channel load reference value is equal to or greater than the predetermined threshold value, the unit decides a shorter occupancy time (or a lower time occupancy rate).

As another example, the measurement information includes a noise histogram report, and the parameters include an IPI density value. In this case, if the IPI density value is less than a predetermined threshold value, the communication control unit 155 decides a longer occupancy time (or a higher time occupancy rate), and if the IPI density value is equal to or greater than the predetermined threshold value, the unit decides a shorter occupancy time (or a lower time occupancy rate).

Parameters included in the measurement information are not limited to the above examples, and the measurement information can include various parameters. Thus, an occupancy time (or a time occupancy rate) can be decided according to the various parameters. Furthermore, an occupancy time (or a time occupancy rate) may of course be decided according to a combination of a plurality of parameters, rather than being decided according to a single parameter.

Note that, when the predetermined condition for a reception state of beacons transmitted from the access point of the wireless LAN is not satisfied, for example, the communication control unit 155 decides the time for which it occupies the shared band for the cellular system based on the measurement information. The predetermined condition is as described above.

Flow to Decision

The processing unit 150 (for example, the communication control unit 155) determines whether reception power of all beacons received for the fixed period of time is less than the predetermined threshold value. If the reception power of any beacon is equal to or greater than the predetermined threshold value, the processing unit 150 (for example, the communication control unit 155) checks whether there is an RRM capability IE in each of the one or more beacons. Then, the processing unit 150 (for example, the communication control unit 155) selects the access point 200 that transmitted the beacon including the RRM capability IE among the one or more access points. Furthermore, the requesting unit 151 requests the measurement information from the selected access point 200. Thereafter, the access point 200 provides the measurement information of the shared band to the base station 100.

Thereafter, the information acquisition unit 153 acquires the measurement information. Then, the communication control unit 155 decides to occupy the shared band for the cellular system for the time according to the parameters included in the measurement information.

Note that the process described above can be performed at a relatively short cycle.

The time for which the shared band for the cellular system is to be occupied is decided based on the measurement information as described above. Note that a shared band occupied for the cellular system is limited to, for example, a shared band for which measurement information is requested.

The time for which the shared band for the cellular system is to be occupied is decided based on, for example, the measurement information as described above. Accordingly, for example, it is possible to suppress a decrease in occasions on which the shared band can be used in the wireless LAN. More specifically, for example, the time for which the shared band is to be occupied is decided in consideration of states of wireless LAN communication of surrounding environments. Thus, as an example, when the shared band is frequently used in the wireless LAN, occupying the shared band for a short period of time for the cellular system is decided, and when the shared band is not used much in the wireless LAN, occupying the shared band for a long period of time for the cellular system is decided. As a result, a decrease in occasions on which the shared band can be used in the wireless LAN can be suppressed.

(a-3) Other Decision

When, for example, the predetermined condition for a reception state of beacons transmitted from an access point of the wireless LAN is not satisfied and the measurement information is not provided, the communication control unit 155 decides not to occupy the shared band for the cellular system.

More specifically, for example, although reception power of one or more beacons received by the base station 100 for the fixed period of time is equal to or greater than the predetermined threshold value, none of one or more access points that transmitted the one or more beacons has an RRM capability of IEEE 802.11k. In this case, the communication control unit 155 decides not to occupy the shared band for the cellular system.

Accordingly, for example, it is possible to reliably suppress a decrease in occasions on which the shared band can be used in the wireless LAN.

(b) Occupancy of a Shared Band

The communication control unit 155, for example, occupies the shared band for the cellular system.

Specific Technique

Specifically, for example, the communication control unit 155 transmits a frame including a duration field (for example, an RTS frame or a CTS frame) (via the wireless communication unit 120) according to CMSA/CA using the shared band. Accordingly, for example, an access point and a station of the wireless LAN set the value included in the duration field as an NAV, and hold transmission of a signal for the time corresponding to the NAV. Accordingly, the shared band is occupied for the cellular system.

Note that, instead of or in addition to transmission of the frame, the communication control unit 155 may continuously transmit signals using the shared band. Accordingly, the signals serve as busy tones with respect to an access point and a station of the wireless LAN, and thus the access point and the station of the wireless LAN can hold transmission of signals.

Specific Examples of Occupancy

Specific examples of occupancy of the shared band for the cellular system will be described with reference to FIGS. 8 to 10. In these examples, an occupancy time of the shared band for the cellular system is decided based on the measurement information.

Figure 8:
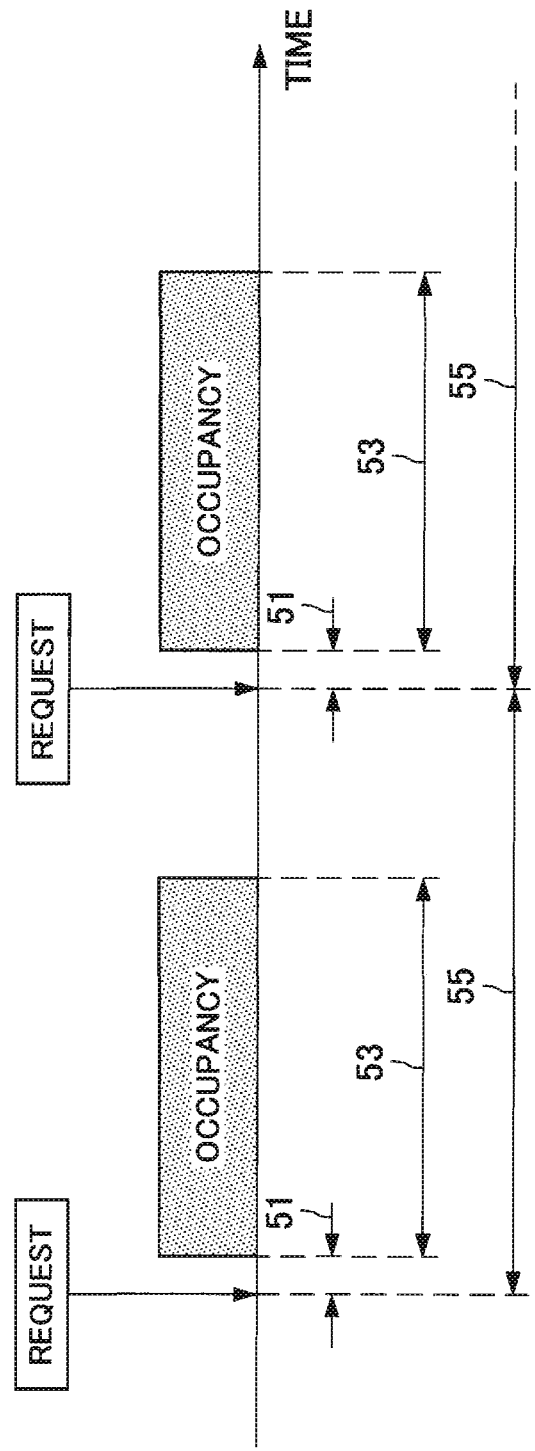
FIG. 8 is an illustrative diagram for describing a first example of occupancy of the shared band for the cellular system.

FIG. 8 is an illustrative diagram for describing a first example of occupancy of the shared band for the cellular system. Referring to FIG. 8, for example, the base station 100 requests measurement information from the access point 200 at a predetermined cycle 55. Then, the base station 100 decides an occupancy time based on the measurement information provided by the access point 200 within a predetermined preparation period 51 from the request for the measurement information. After the end of the preparation period 51, the shared band is occupied for the cellular system through a continuous occupancy time 53.

Figure 9:
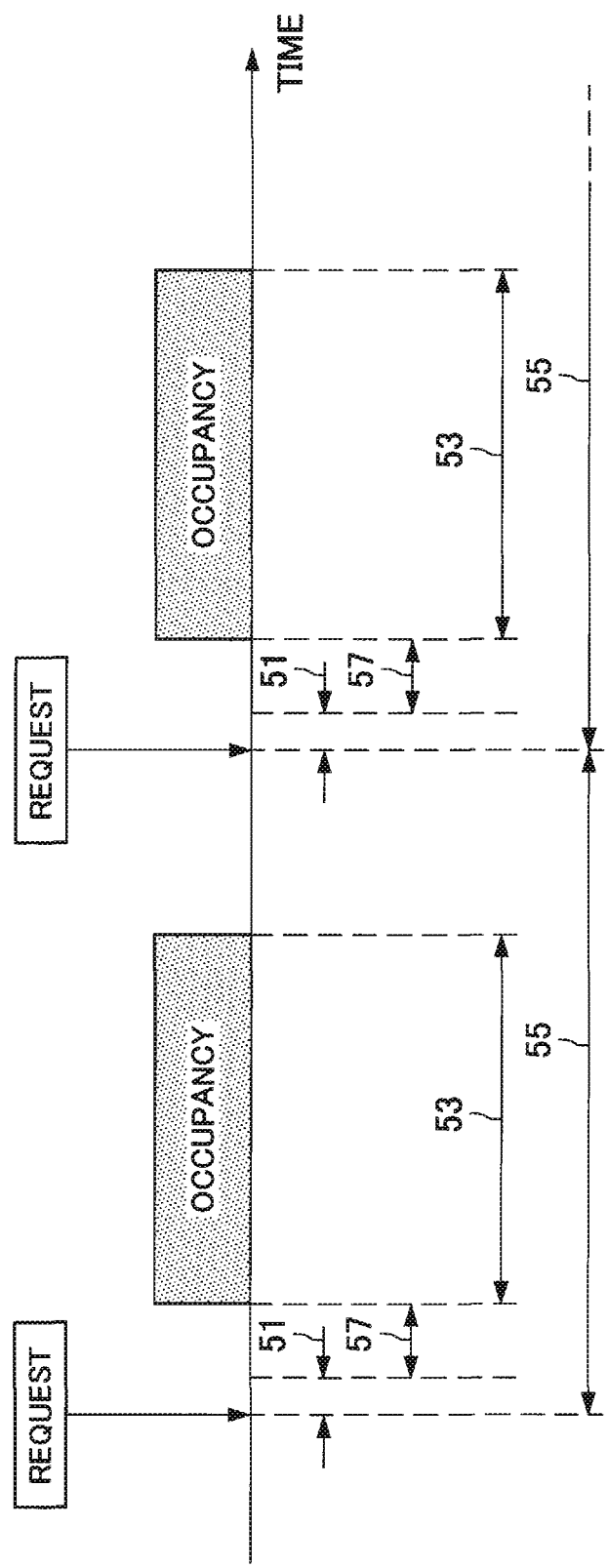
FIG. 9 is an illustrative diagram for describing a second example of occupancy of the shared band for the cellular system.

FIG. 9 is an illustrative diagram for describing a second example of occupancy of the shared band for the cellular system. Referring to FIG. 9, for example, the base station 100 requests measurement information from the access point 200 at the predetermined cycle 55. Then, the base station 100 decides an occupancy time based on the measurement information provided by the access point 200 within the predetermined preparation period 51 from the request for the measurement information. In particular, in this example, the shared band is occupied for the cellular system through the continuous occupancy time 53 after the preparation period 51 ends and further after a predetermined offset time 57 elapses. For example, the timing of occupancy can be sent by the predetermined offset time 57 according to a state of buffering of an access point of the wireless LAN.

Figure 10:
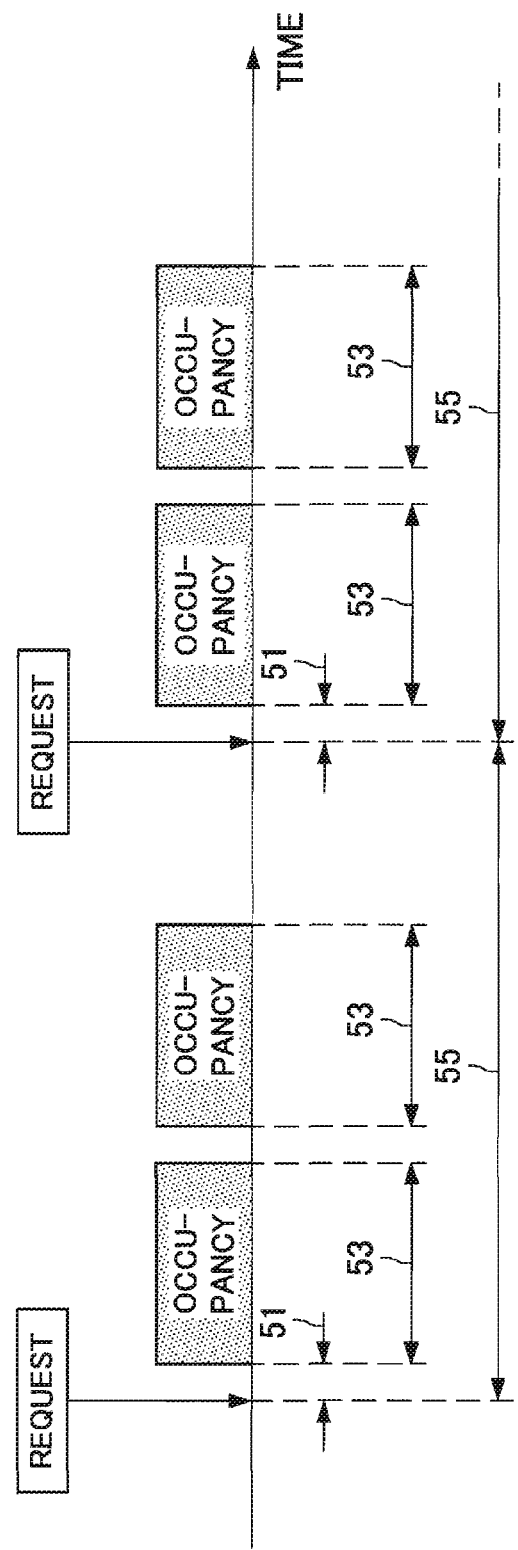
FIG. 10 is an illustrative diagram for describing a third example of occupancy of the shared band for the cellular system.

FIG. 10 is an illustrative diagram for describing a third example of occupancy of the shared band for the cellular system. Referring to FIG. 10, for example, the base station 100 requests measurement information from the access point 200 at the predetermined cycle 55. Then, the base station 100 decides an occupancy time based on the measurement information provided by the access point 200 within the predetermined preparation period 51 from the request for the measurement information. In particular, in this example, the shared band is occupied for the cellular system through discontinuous occupancy times 53 after the end of the preparation period 51.

The shared band is occupied for the cellular system, for example, as described above. Note that occupancy of the shared band is not limited to these examples, and various occupancy techniques can be applied.

(c) Decision of an Occupancy Timing of the Shared Band

The communication control unit 155 may decide a timing at which the shared band is occupied for the cellular system.

For example, the communication control unit 155 may decide a timing at which the shared band is occupied for the cellular system based on a state of buffering of an access point of the wireless LAN. Specifically, the communication control unit 155 may determine whether data is being buffered in the access point with reference to a DTIM of received beacons. Then, when data is buffered in the access point, communication control unit 155 may delay the timing at which the shared band is occupied for the cellular system. Accordingly, for example, it is possible to reduce a delay in transmission of data on the wireless LAN.

3.2. <Configuration of an Access Point>

Figure 11:
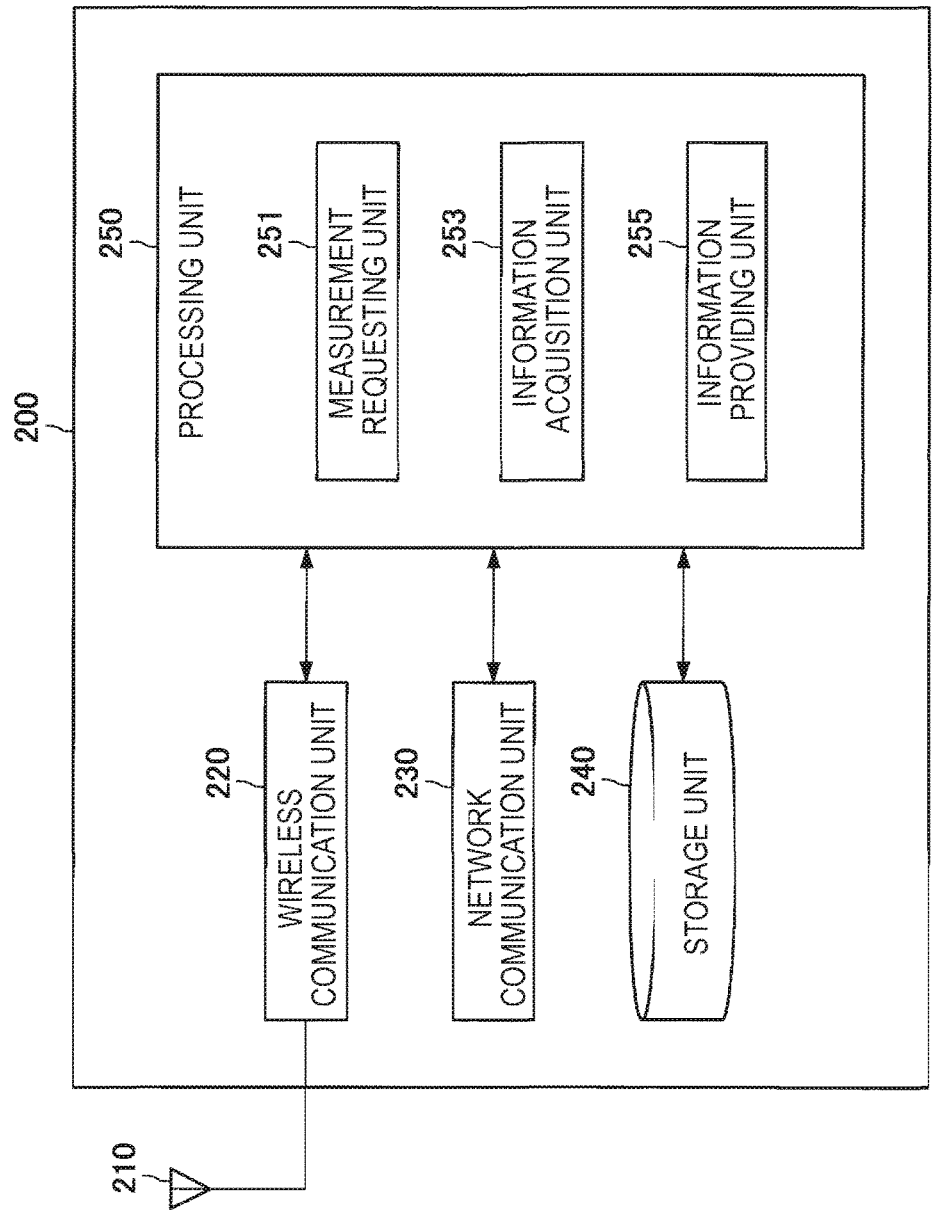
FIG. 11 is a block diagram showing an example of a configuration of an access point according to the same embodiment.

First, an example of a configuration of the access point 200 according to the embodiment of the present disclosure will be described with reference to FIG. 11. FIG. 11 is a block diagram showing the example of the configuration of the access point 200 according to the embodiment of the present disclosure. Referring to FIG. 11, the access point 200 is provided with an antenna unit 210, a wireless communication unit 220, a network communication unit 230, a storage unit 240, and a processing unit 250.

(Antenna Unit 210)

The antenna unit 210 radiates signals output from the wireless communication unit 220 to a space as radio waves. In addition, the antenna unit 210 converts radio signals from a space into signals, and outputs the signals to the wireless communication unit 220.

(Wireless Communication Unit 220)

The wireless communication unit 220 transmits and receives signals of wireless LAN communication. For example, the wireless communication unit 220 transmits signals to the wireless LAN terminal 40, and receives signals from the wireless LAN terminal 40. In addition, for example, the wireless communication unit 220 receives signals from the base station 100, and transmits signals to the base station 100. The wireless communication unit 220 transmits and receives signals of wireless LAN communication using, for example, a shared band.

(Network Communication Unit 230)

The network communication unit 230 communicates with other nodes. For example, the network communication unit 230 may communicate with the base station 100 via backhaul.

(Storage Unit 240)

The storage unit 240 temporarily or permanently stores programs and data for operations of the access point 200.

(Processing Unit 250)

The processing unit 250 provides various functions of the access point 200. The processing unit 250 includes a measurement requesting unit 251, an information acquisition unit 253, and an information providing unit 255. Note that the processing unit 250 can further include constituent elements other than these constituent elements. That is, the processing unit 250 can perform operations other than the operations of these constituent elements as well.

(Measurement Requesting Unit 251)

The measurement requesting unit 251 requests a report on a shared band from the wireless LAN terminal 40 (i.e., a station).

The report is a report complying with, for example, IEEE 802.11k. Specifically, for example, the report includes one or more reports among a channel load report, a noise histogram report, a beacon report, a frame report, an STA statistic report, a location configuration information report, a transmit stream/category measurement report, and a neighbor report.

Upon receiving a request for measurement information of the shared band from the base station 100, for example, the measurement requesting unit 251 requests a report on the shared band from the wireless LAN terminal 40. Specifically, for example, the measurement requesting unit 251 transmits a frame for requesting the report on the shared band to the wireless LAN terminal 40 via the wireless communication unit 220.

(Information Acquisition Unit 253)

The information acquisition unit 253 acquires the measurement information that is measurement information of a frequency band (i.e., the shared band) shared between the cellular system and the wireless LAN and is generated by a wireless LAN device.

The measurement information is, for example, a report complying with IEEE 802.11k or information based on the report.

As an example, the measurement information is a report complying with IEEE 802.11k, and the wireless LAN device that generates the measurement information is the wireless LAN terminal 40. That is, the information acquisition unit 253 acquires the report complying with IEEE 802.11k (the measurement information) generated by the wireless LAN terminal 40.

As another example, the measurement information may be information generated based on the report complying with IEEE 802.11k, and the wireless LAN device that generates the measurement information may be the access point 200. That is, the information acquisition unit 253 may acquire the information (the measurement information) generated by the access point 200 based on the report complying with IEEE 802.11k. As a specific example, the processing unit 250 may generate a new parameter as the measurement information from parameters included in the report provided by the wireless LAN terminal 40 complying with IEEE 802.11k (for example, the average value, the total value, or the like of the parameters included in the report). Then, the information acquisition unit 253 may acquire the new parameter as the measurement information.

(Information Providing Unit 255)

The information providing unit 255 provides the measurement information to the base station 100.

For example, the information providing unit 255 provides the measurement information acquired by the information acquisition unit 253 to the base station 100 through the wireless LAN communication. More specifically, for example, the information providing unit 255 transmits the measurement information to the base station 100 via the wireless communication unit 220.

Alternatively, the information providing unit 255 may provide the measurement information to the base station 100 through communication via backhaul, rather than through the wireless LAN communication. More specifically, the information providing unit 255 may transmit the measurement information to the base station 100 via the network communication unit 230.

Accordingly, for example, the base station 100 can ascertain states of the wireless LAN communication in surrounding environments.

4. <<Process Flow>>

Next, examples of the processes according to the embodiment of the present disclosure will be described with reference to FIGS. 12 to 14.

(Process of the Base Station)

Figure 12:
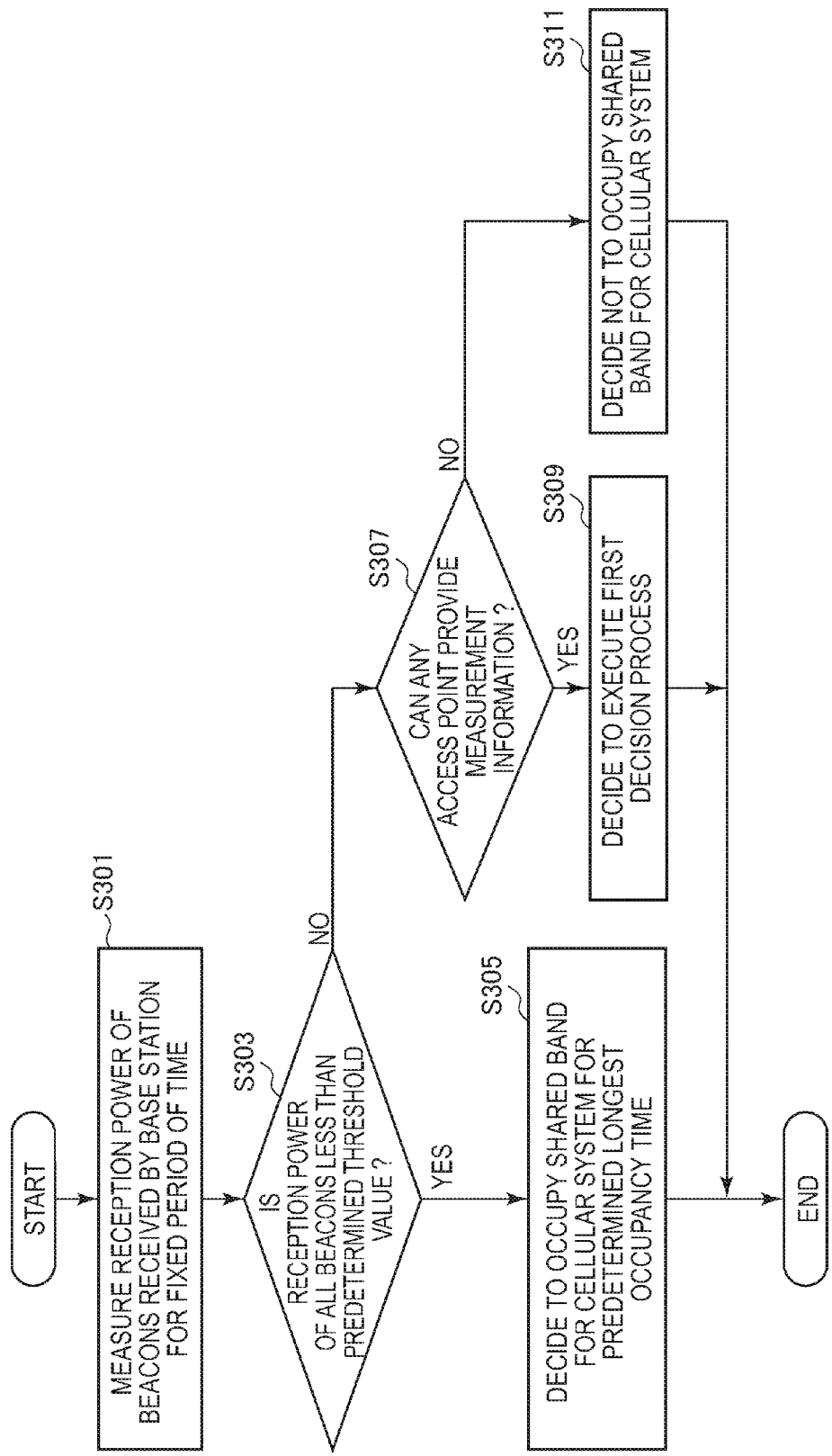
FIG. 12 is a flowchart showing an example of a schematic flow of a process of a base station according to the same embodiment.

FIG. 12 is a flowchart showing an example of a schematic flow of a process of the base station 100 according to the embodiment of the present disclosure. The process is executed at a relatively long cycle.

First, the processing unit 150 measures reception power of beacons received by the base station 100 for the fixed period of time (S301).

Thereafter, the processing unit 150 (for example, the communication control unit 155) determines whether the reception power of all beacons received for the fixed period of time is less than the predetermined threshold value (S303).

If the reception power of all the beacons is less than the predetermined threshold value (Yes in S303), the communication control unit 155 decides to occupy the shared band for the cellular system for the predetermined longest occupancy time. Then, the process ends.

On the other hand, if reception power of any beacon is equal to or greater than the predetermined threshold value (No in S303), the processing unit 150 (for example, the communication control unit 155) checks whether any access point that transmits one or more beacons received by the base station 100 can provide the measurement information (S307). More specifically, the processing unit 150 (for example, the communication control unit 155) checks whether there is an RRM capability IE in each of the one or more beacons.

If any access point can provide the measurement information (Yes in S307), the communication control unit 155 decides to execute a first decision process (S309). Then, the process ends. Note that the first decision process is a process of deciding an occupancy time of the shared band for the cellular system based on the measurement information provided by the access point 200.

On the other hand, if no access point can provide measurement information (No in S307), the communication control unit 155 decides not to occupy the shared band for the cellular system (S311). Then, the process ends.

Note that, although the above-described example is decision of an occupancy time, instead of or in addition to the occupancy time, a time occupancy rate may be decided.

(First Decision Process)

Figure 13:
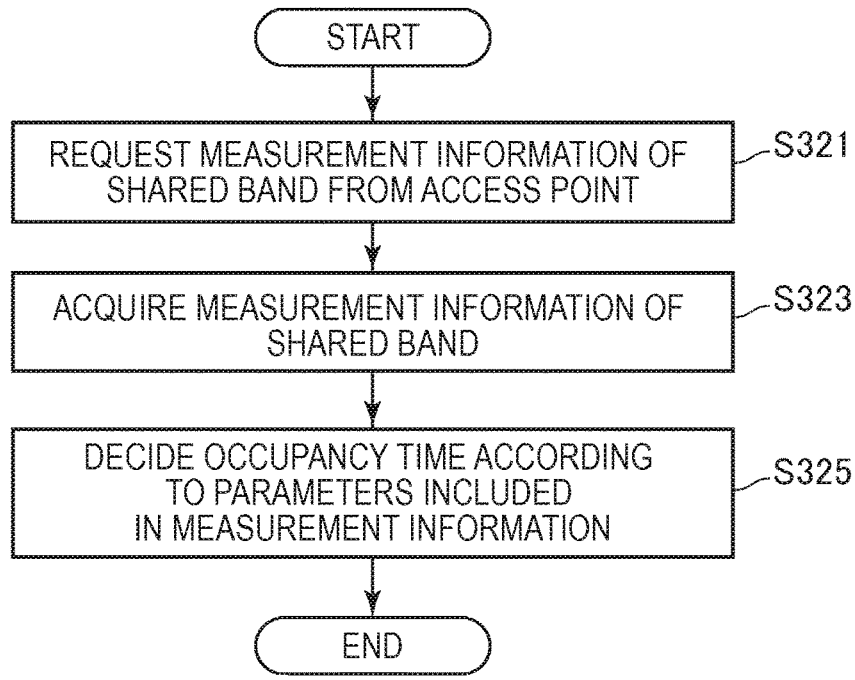
FIG. 13 is a flowchart showing an example of a schematic flow of a first decision process according to the same embodiment.

FIG. 13 is a flowchart showing an example of a schematic flow of the first decision process according to the embodiment of the present disclosure. The first decision process is executed at a relatively short cycle.

The requesting unit 151 requests measurement information of the shared band from the access point 200 (S321).

Then, the information acquisition unit 153 acquires the measurement information of the shared band provided by the access point 200 (S323).

Thereafter, the communication control unit 155 decides an occupancy time according to the parameters included in the measurement information (S325). Then, the process ends.

Note that, although the above-described example is decision of an occupancy time, instead of or in addition to the occupancy time, a time occupancy rate may be decided.

(Process of an Access Point)

Figure 14:
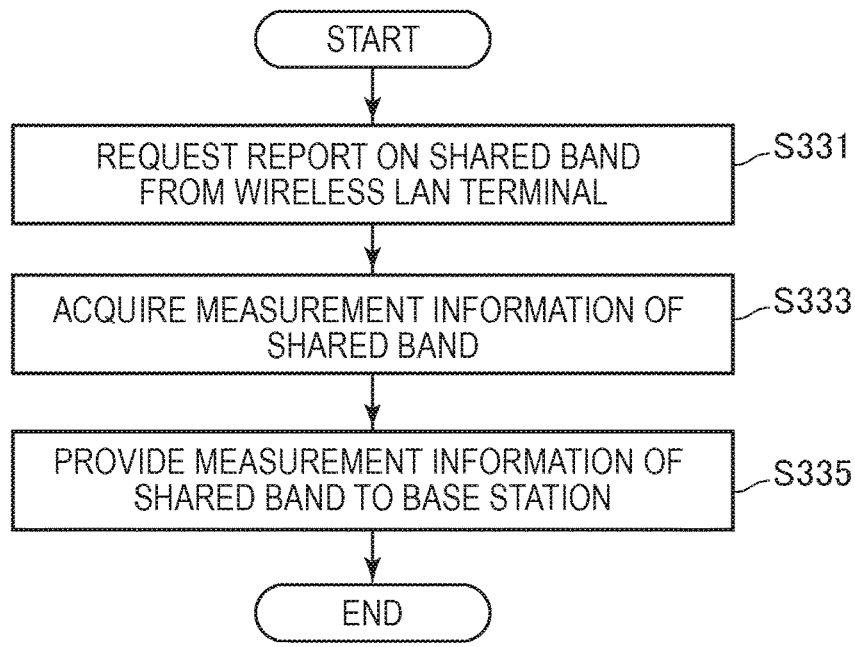
FIG. 14 is a flowchart showing an example of a schematic flow of a process of an access point according to the same embodiment.

FIG. 14 is a flowchart showing an example of a schematic flow of a process of the access point 200 according to the embodiment of the present disclosure. The process is executed according to a request of the base station 100 for the measurement information.

The measurement requesting unit 251 requests a report on the shared band from the wireless LAN terminal 40 (i.e., a station) (S331). For example, the report is a report complying with IEEE 802.11k.

Then, the information acquisition unit 253 acquires the measurement information of the shared band generated by the wireless LAN device (S333). As an example, the measurement information is a report complying with IEEE 802.11k, and the wireless LAN device that generates the measurement information is the wireless LAN terminal 40. As another example, the measurement information may be information generated based on the report complying with IEEE 802.11k, and the wireless LAN device that generates the measurement information may be the access point 200. In this case, the processing unit 150 may generate the measurement information based on the report complying with IEEE 802.11k.

The information providing unit 255 provides the measurement information of the shared band to the base station 100 (S335). Then, the process ends.

5. <<Modified Example>>

Next, a modified example of the present embodiment will be described with reference to FIGS. 15 and 16.

In the example of the present embodiment described above, when the predetermined condition for a reception state of beacons transmitted from an access point of the wireless LAN is not satisfied and the measurement information is not provided, it is decided not to occupy the shared band for the cellular system.

On the other hand, in the modified example of the present embodiment, when the predetermined condition for a reception state of beacons transmitted from an access point of the wireless LAN is not satisfied and the measurement information is not provided, the time for which the shared band is to be occupied for the cellular system is decided based on a reception state of a predetermined frame complying with a wireless LAN standard in the shared band.

(Base Station 100: Communication Control Unit 155)
(a-3) Other Decision

In particular, in the modified example of the present embodiment, when the predetermined condition for a reception state of beacons transmitted from an access point of the wireless LAN is not satisfied and the measurement information is not provided, the communication control unit 155 decides the time for which it occupies the shared band for the cellular system based on a reception state of a predetermined frame complying with a wireless LAN standard in the shared band.

More specifically, for example, although the reception power of one or more beacons received by the base station 100 for a fixed period of time is equal to or greater than a predetermined threshold value, none of one or more access points that transmitted the one or more beacons has an RRM capability of IEEE 802.11k. In this case, the communication control unit 155 decides the time for which it occupies the shared band for the cellular system based on a reception state of a predetermined frame complying with a wireless LAN standard in the shared band.

Reception State of a Predetermined Frame

The predetermined frame is, for example, an RTS frame and/or a CTS frame.

The reception state of the predetermined frame includes, for example, a frequency at which the predetermined frame is received in the shared band. In this case, the communication control unit 155 decides to occupy the shared band for the cellular system for the time according to the frequency. For example, when the frequency is higher, the communication control unit 155 decides to occupy the shared band for the cellular system for a shorter time, and when the frequency is lower, the unit decides to occupy the shared band for the cellular system for a longer time.

More specifically, for example, the processing unit 150 (for example, the communication control unit 155) calculates a frequency at which the predetermined frame is received by the base station 100 in the shared band. Then, the communication control unit 155 decides an occupancy time (or a time occupancy rate) according to the calculated frequency.

As described above, the time for which the shared band is occupied for the cellular system is decided based on a reception state of the predetermined frame in the shared band. Accordingly, for example, while a decrease in occasions on which the shared band can be used in a wireless LAN is suppressed, the time for which the shared band is appropriated for the cellular system can be further lengthened.

(Process Flow: Process of a Base Station)

Figure 15:
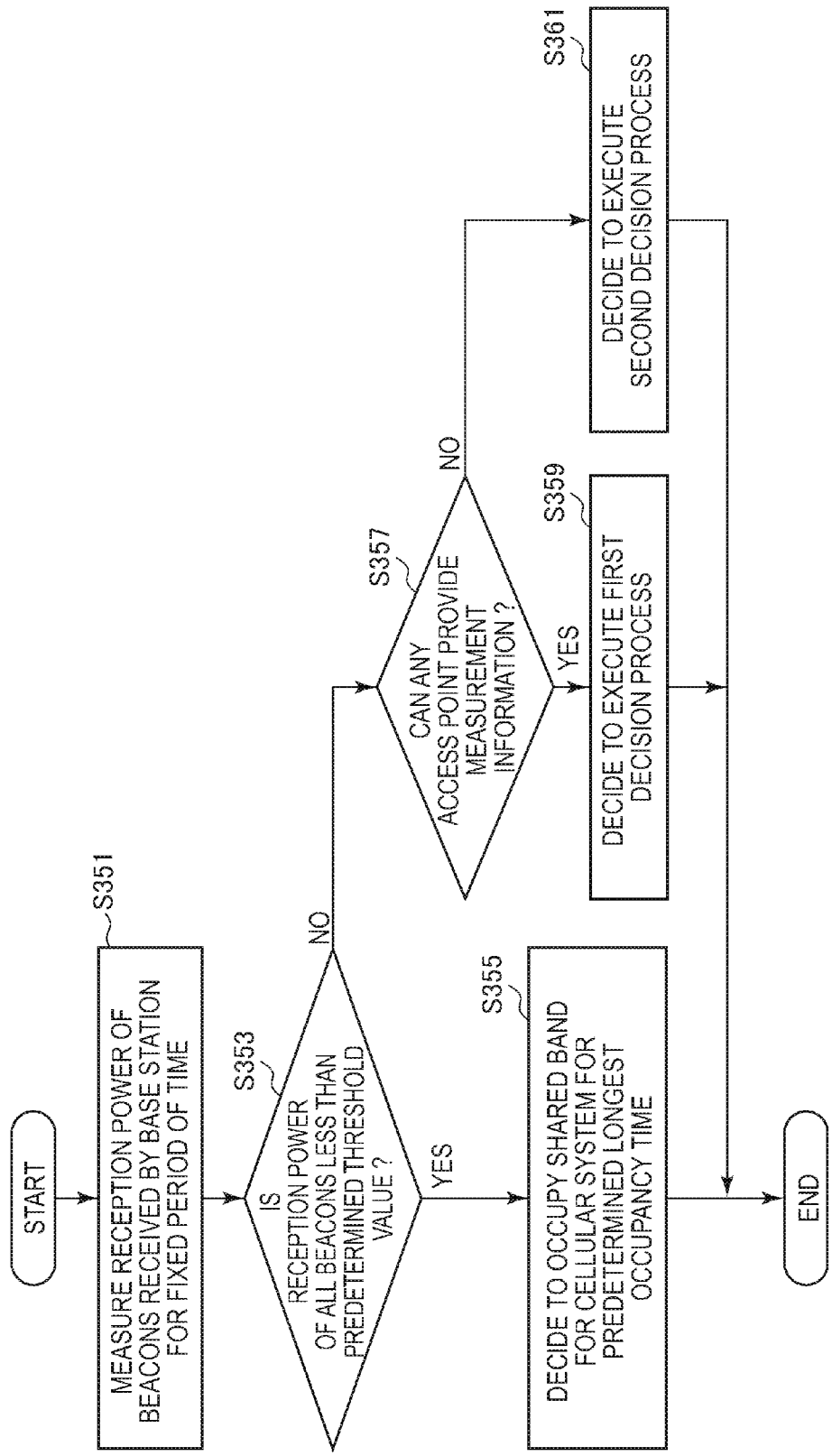
FIG. 15 is a flowchart showing an example of a schematic flow of a process of a base station according to a modified example of the same embodiment.

FIG. 15 is a flowchart showing an example of a schematic flow of a process of the base station 100 according to the modified example of the embodiment of the present disclosure. The process is executed at a relatively long cycle.

Note that description of Steps S351 to S359 shown in FIG. 15 is the same as the description of Steps S301 to S309 shown in FIG. 12, and thus overlapping description will be omitted.

When no access point can provide measurement information (No in S357), the communication control unit 155 decides to execute a second decision process (S361). Then, the process ends. Note that the second decision process is a process of deciding an occupancy time of the shared band for the cellular system based on a reception state of a predetermined frame complying with a wireless LAN standard.

Note that, although the above-described example is an example in which an occupancy time is decided, instead of or in addition to the occupancy time, a time occupancy rate may be decided.

(Process Flow: Second Decision Process)

Figure 16:
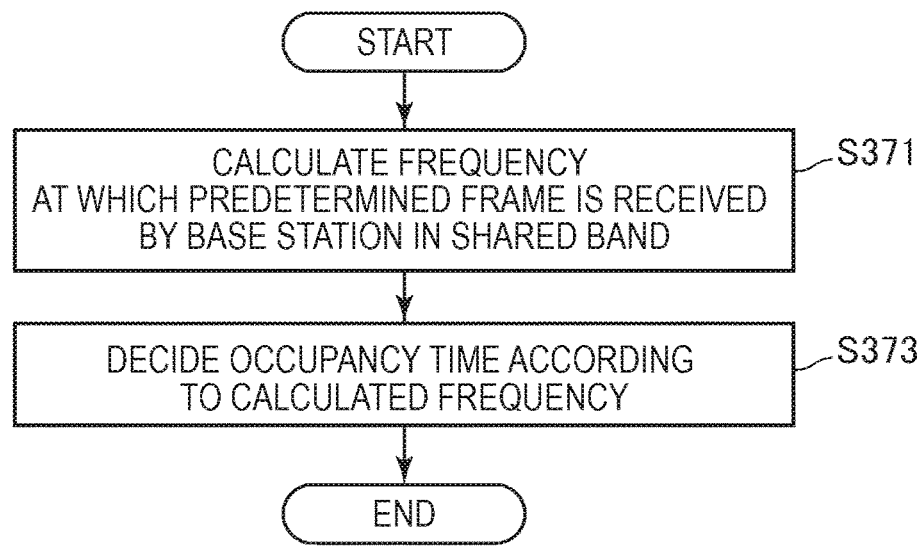
FIG. 16 is a flowchart showing an example of a schematic flow of a second decision process according to the same embodiment.

FIG. 16 is a flowchart showing an example of a schematic flow of the second decision process according to the embodiment of the present disclosure. The second decision process is executed at a relatively short cycle.

The processing unit 150 (for example, the communication control unit 155) computes a frequency at which the predetermined frame is received by the base station 100 in the shared band (S371).

Then, the communication control unit 155 decides an occupancy time according to the calculated frequency (S373).

Note that, although the above-described example is an example in which the occupancy time is decided, instead of or in addition to the occupancy time, a time occupancy rate may be decided.

6. <<Application Examples>>

The technology according to the present disclosure is applicable to a variety of products. For example, the base station 100 may be implemented as any type of evolved Node B (eNB) such as a macro eNB or a small eNB. Small eNBs may be, for example, pico eNBs, micro eNBs, or home (femto) eNBs that cover smaller cells than the macro cells. Instead, the base station 100 may be implemented as another type of base station such as a NodeB or a base transceiver stations (BTS). The base station 100 may include a main device (which is also referred to as a base station device) that controls wireless communication and one or more remote radio heads (RRHs) that are arranged at different places from that of the main device. Various types of terminal devices as discussed later may temporarily or semi-persistently execute the base station function to function as the base station 100.

In addition, the access point 200 may be realized as, for example, a wireless LAN access point having a router function or having no router function (also called a wireless base station). In addition, the access point 200 may be realized as a mobile wireless LAN router. Further, at least some of the constituent elements of the access point 200 may be realized as a module mounted in the devices (for example, an integrated circuit module configured in one die).

6.1. <Application Example of a Base Station>
(First Application Example)

Figure 17:
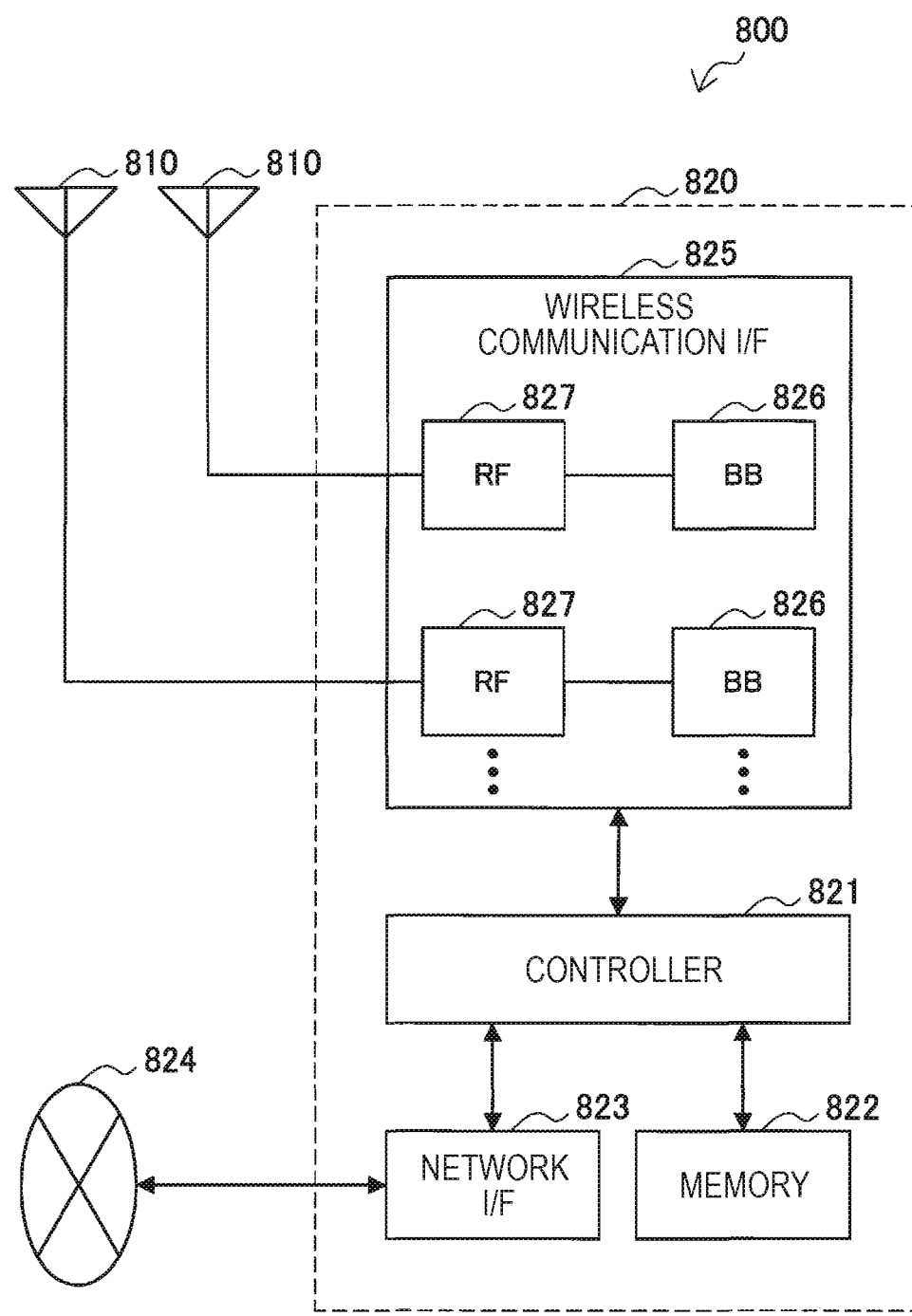
FIG. 17 is a block diagram showing a first example of a schematic configuration of an eNB.

FIG. 17 is a block diagram showing a first example of a schematic configuration of an eNB to which the technology according to the present disclosure may be applied. An eNB 800 includes one or more antennas 810 and a base station device 820. Each antenna 810 and the base station device 820 may be connected to each other via an RF cable.

Each of the antennas 810 includes a single or a plurality of antenna elements (e.g. antenna elements included in a MIMO antenna) and is used for the base station device 820 to transmit and receive a wireless signal. The eNB 800 may include the plurality of the antennas 810 as shown in FIG. 17, and the plurality of antennas 810 may, for example, correspond to a plurality of frequency bands used by the eNB 800. FIG. 17 illustrates an example in which the eNB 800 includes the plurality of antennas 810, but the eNB 800 may include a single antenna 810.

The base station device 820 includes a controller 821, a memory 822, a network interface 823, and a wireless communication interface 825.

The controller 821 may be, for example, a CPU or a DSP, and operates various functions of an upper layer of the base station device 820. For example, the controller 821 generates a data packet from data in a signal processed by the wireless communication interface 825, and transfers the generated packet via the network interface 823. The controller 821 may generate a bundled packet by bundling data from a plurality of base band processors to transfer the generated bundled packet. The controller 821 may also have a logical function of performing control such as radio resource control, radio bearer control, mobility management, admission control, or scheduling. The control may be performed in cooperation with a surrounding eNB or a core network. The memory 822 includes a RAM and a ROM, and stores a program executed by the controller 821 and a variety of control data (e.g. a terminal list, transmission power data, and scheduling data).

The network interface 823 is a communication interface for connecting the base station device 820 to the core network 824. The controller 821 may communicate with a core network node or another eNB via the network interface 823. In this case, the controller 821 may be mutually connected to the eNB 800 and a core network node or another eNB through a logical interface (e.g. S1 interface or X2 interface). The network interface 823 may be a wired communication interface or a wireless communication interface for wireless backhaul. If the network interface 823 is a wireless communication interface, the network interface 823 may use a higher frequency band for wireless communication than a frequency band used by the wireless communication interface 825.

The wireless communication interface 825 supports a cellular communication system such as long term evolution (LTE) or LTE-Advanced, and provides a wireless connection to a terminal positioned within the cell of the eNB 800 via the antenna 810. The wireless communication interface 825 may typically include a base band (BB) processor 826 and an RF circuit 827. The BB processor 826 may, for example, perform encoding/decoding, modulation/demodulation, multiplexing/demultiplexing, and the like, and performs a variety of signal processing on each layer (e.g. L1, medium access control (MAC), radio link control (RLC), and packet data convergence protocol (PDCP)). The BB processor 826 may have a part or all of the logical functions as discussed above instead of the controller 821. The BB processor 826 may be a module including a memory having a communication control program stored therein, a processor to execute the program, and a related circuit, and the function of the BB processor 826 may be changeable by updating the program. The module may be a card or a blade to be inserted into a slot of the base station device 820, or a chip mounted on the card or the blade. Meanwhile, the RF circuit 827 may include a mixer, a filter, an amplifier, and the like, and transmits and receives a radio signal via the antenna 810.

Figure 19:
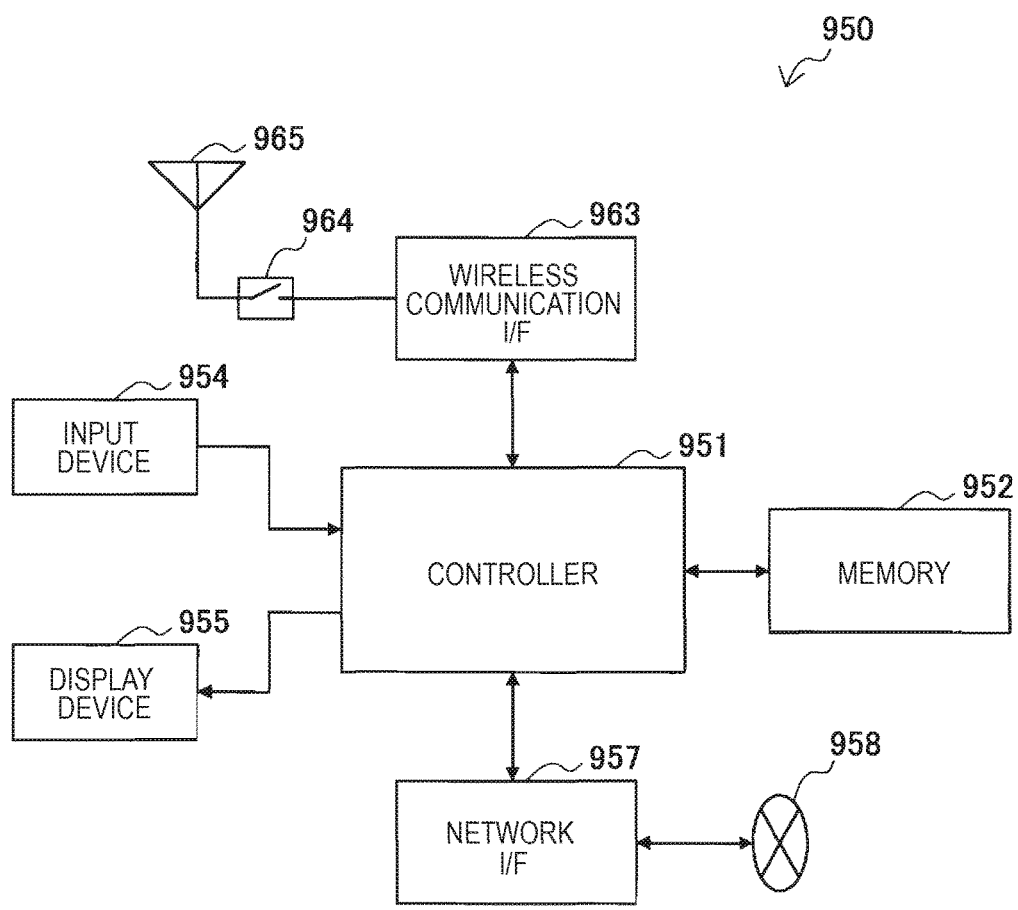
FIG. 19 is a block diagram showing an example of a schematic configuration of a wireless access point.

The wireless communication interface 825 may include a plurality of BB processors 826 as shown in FIG. 19, and the plurality of BB processors 826 may, for example, correspond to a plurality of frequency bands used by the eNB 800. The wireless communication interface 825 also may include a plurality of RF circuits 827, as shown in FIG. 19, and the plurality of RF circuits 827 may, for example, correspond to a plurality of antenna elements. FIG. 19 illustrates an example in which the wireless communication interface 825 includes the plurality of BB processors 826 and the plurality of RF circuits 827, but the wireless communication interface 825 may include a single BB processor 826 or a single RF circuit 827.

Furthermore, the wireless communication interface 825 may support a wireless LAN communication scheme, in addition to a cellular communication scheme, and in this case, the interface may include a BB processor 826 and an RF circuit 827 of the wireless LAN communication scheme.

In the eNB 800 shown in FIG. 17, one or more constituent elements (for example, the requesting unit 151, the information acquisition unit 153, and/or the communication control unit 155) included in the processing unit 150 described with reference to FIG. 7 may be implemented in the wireless communication interface 825. Alternatively, at least some of the one or more constituent elements may be implemented by the controller 821. As an example, a module that includes a part (for example, the BB processor 826) or all of the wireless communication interface 825, and/or the controller 821 may be mounted in the eNB 800, and the module may implement the one or more constituent elements (for example, the requesting unit 151, the information acquisition unit 153, and/or the communication control unit 155). In this case, the module may store a program for causing a processor to function as the one or more constituent elements (in other words, a program for causing a processor to execute the operations of the one or more constituent elements) to execute the program. As another example, a program for causing a processor to function as the one or more constituent elements may be installed in the eNB 800, and the wireless communication interface 825 (for example, the BB processor 826) and/or the controller 821 may execute the program. As described above, the eNB 800, the base station device 820, or the module may be provided as a device provided with the one or more constituent elements, and the program for causing a processor to function as the one or more constituent elements may be provided. In addition, a readable storage medium in which the program is stored may be provided.

In addition, the wireless communication unit 120 described with reference to FIG. 7 may be implemented in the wireless communication interface 825 (for example, the RF circuit 827) in the eNB 800 shown in FIG. 17. In addition, the antenna unit 110 may be implemented in the antennas 810. In addition, the network communication unit 130 may be implemented in the controller 821 and/or the network interface 823.

(Second Application Example)

Figure 18:
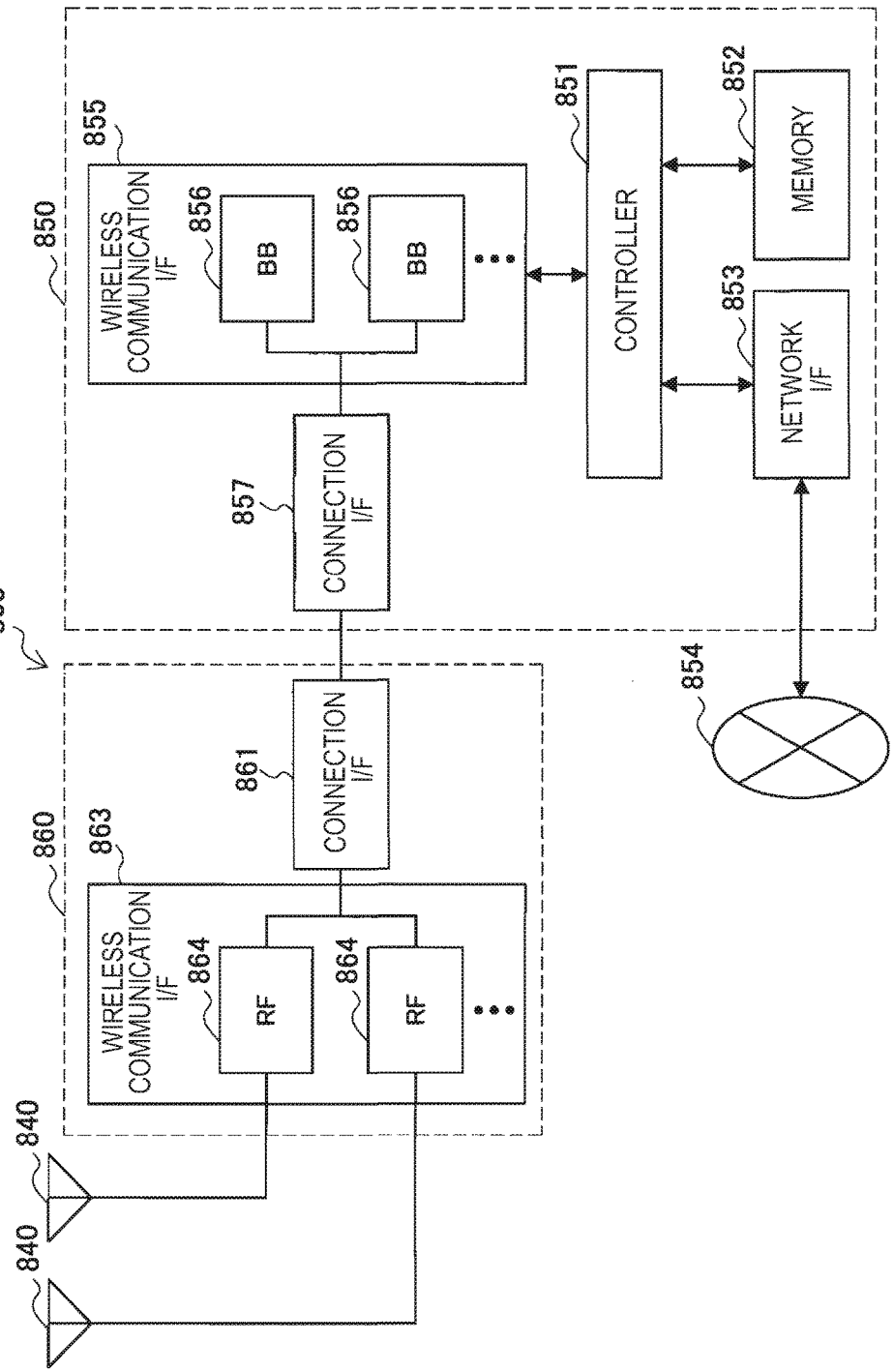
FIG. 18 is a block diagram showing a second example of a schematic configuration of an eNB.

FIG. 18 is a block diagram showing a second example of a schematic configuration of an eNB to which the technology according to the present disclosure may be applied. An eNB 830 includes one or more antennas 840, a base station device 850, and an RRH 860. Each of the antennas 840 and the RRH 860 may be connected to each other via an RF cable. The base station device 850 and the RRH 860 may be connected to each other by a high speed line such as optical fiber cables.

Each of the antennas 840 includes a single or a plurality of antenna elements (e.g. antenna elements included in a MIMO antenna), and is used for the RRH 860 to transmit and receive a wireless signal. The eNB 830 may include a plurality of the antennas 840 as shown in FIG. 18, and the plurality of antennas 840 may, for example, correspond to a plurality of frequency bands used by the eNB 830. FIG. 18 illustrates an example in which the eNB 830 includes the plurality of antennas 840, but the eNB 830 may include a single antenna 840.

The base station device 850 includes a controller 851, a memory 852, a network interface 853, a wireless communication interface 855, and a connection interface 857. The controller 851, the memory 852, and the network interface 853 are the same as the controller 821, the memory 822, and the network interface 823 described with reference to FIG. 17.

The wireless communication interface 855 supports a cellular communication system such as LTE or LTE-Advanced, and provides a wireless connection to a terminal positioned in a sector corresponding to the RRH 860 via the RRH 860 and the antenna 840. The wireless communication interface 855 may typically include a BB processor 856. The BB processor 856 is the same as the BB processor 826 described with reference to FIG. 17 except that the BB processor 856 is connected to an RF circuit 864 of the RRH 860 via the connection interface 857. The wireless communication interface 855 may include a plurality of the BB processors 856, as shown in FIG. 18, and the plurality of BB processors 856 may, for example, correspond to a plurality of frequency bands used by the eNB 830 respectively. FIG. 18 illustrates an example in which the wireless communication interface 855 includes the plurality of BB processors 856, but the wireless communication interface 855 may include a single BB processor 856.

The connection interface 857 connects the base station device 850 (wireless communication interface 855) to the RRH 860. The connection interface 857 may be a communication module for communication on the high speed line which connects the base station device 850 (wireless communication interface 855) to the RRH 860.

The RRH 860 includes a connection interface 861 and a wireless communication interface 863.

The connection interface 861 connects the RRH 860 (wireless communication interface 863) to the base station device 850. The connection interface 861 may be a communication module for communication on the high speed line.

The wireless communication interface 863 transmits and receives a wireless signal via the antenna 840. The wireless communication interface 863 may typically include the RF circuit 864. The RF circuit 864 may include a mixer, a filter, an amplifier and the like, and transmits and receives a wireless signal via the antenna 840. The wireless communication interface 863 may include a plurality of RF circuits 864 as shown in FIG. 18, and the plurality of RF circuits 864 may, for example, correspond to a plurality of antenna elements. FIG. 18 illustrates an example in which the wireless communication interface 863 includes the plurality of RF circuits 864, but the wireless communication interface 863 may include a single RF circuit 864.

Furthermore, the wireless communication interface 855 may support a wireless LAN communication scheme, in addition to a cellular communication scheme, and in this case, the interface may include a BB processor 856 of the wireless LAN communication scheme.

In the eNB 830 shown in FIG. 18, one or more constituent elements (for example, the requesting unit 151, the information acquisition unit 153, and/or the communication control unit 155) included in the processing unit 150 described with reference to FIG. 7 may be implemented in the wireless communication interface 855 and/or the wireless communication interface 863. Alternatively, at least some of the one or more constituent elements may be implemented by the controller 851. As an example, a module that includes a part (for example, the BB processor 856) or all of the wireless communication interface 855, and/or the controller 851 may be mounted in the eNB 830, and the module may implement the one or more constituent elements (for example, the requesting unit 151, the information acquisition unit 153, and/or the communication control unit 155). In this case, the module may store a program for causing a processor to function as the one or more constituent elements (in other words, a program for causing a processor to execute the operations of the one or more constituent elements) to execute the program. As another example, a program for causing a processor to function as the one or more constituent elements may be installed in the eNB 830, and the wireless communication interface 855 (for example, the BB processor 856) and/or the controller 851 may execute the program. As described above, the eNB 830, the base station device 850, or the module may be provided as a device provided with the one or more constituent elements, and the program for causing a processor to function as the one or more constituent elements may be provided. In addition, a readable storage medium in which the program is stored may be provided.

In addition, the wireless communication unit 120 described, for example, with reference to FIG. 7 may be implemented in the wireless communication interface 863 (for example, the RF circuit 864) in the eNB 830 shown in FIG. 18. In addition, the antenna unit 110 may be implemented in the antennas 840. In addition, the network communication unit 130 may be implemented in the controller 851 and/or the network interface 853.

6.2. <Application Example of an Access Point>

FIG. 19 is a block diagram showing an example of a schematic configuration of a wireless access point 950 to which the technology according to the present disclosure can be applied. The wireless access point 950 is provided with a controller 951, a memory 952, an input device 954, a display device 955, a network interface 957, a wireless communication interface 963, an antenna switch 964, and an antenna 965.

The controller 951 may be, for example, a CPU or a digital signal processor (DSP), and causes the wireless access point 950 to operate various functions of the Internet protocol (IP) layer and higher layers (for example, access restriction, routing, encryption, firewall, log management, and the like). The memory 952 includes a RAM and a ROM, and stores programs executed by the controller 951 and various kinds of control data (for example, terminal lists, routing tables, encryption keys, security settings, logs, and the like).

The input device 954 includes, for example, buttons, switches, or the like, and receives operations from a user. The display device 955 includes an LED lamp or the like, and displays an operation status of the wireless access point 950.

The network interface 957 is a wired communication interface for connecting the wireless access point 950 to a wired communication network 958. The network interface 957 may have a plurality of connection terminals. The wired communication network 958 may be a LAN such as Ethernet (a registered trademark), or a wide area network (WAN).

The wireless communication interface 963 supports one or more of wireless LAN standards such as IEEE 802.11a, 11b, 11g, 11n, 11ac, and 11ad, and provides wireless connection to peripheral terminals as an access point. The wireless communication interface 963 can typically include a baseband processor, an RF circuit, a power amplifier, and the like. The wireless communication interface 963 may be a one-chip module in which a memory that stores a communication control program, a processor that executes the program, and relevant circuits are integrated. The antenna switch 964 switches connection destinations of the antenna 965 among a plurality of circuits included in the wireless communication interface 963. The antenna 965 has a single or a plurality of antenna elements, and is used for the wireless communication interface 963 transmitting and receiving radio signals.

In the wireless access point 950 shown in FIG. 19, one or more constituent elements included in the processing unit 250 described with reference to FIG. 11 (for example, the measurement requesting unit 251, the information acquisition unit 253, and/or the information providing unit 255) may be implemented by the wireless communication interface 963. In addition, at least some of the one or more constituent elements may be implemented by the controller 951. As an example, a module that includes the wireless communication interface 963 and/or the controller 951 may be mounted in the wireless access point 950, and the module may implement the one or more constituent elements (for example, the measurement requesting unit 251, the information acquisition unit 253, and/or the information providing unit 255). In this case, the module may store a program for causing a processor to function as the one or more constituent elements (in other words, a program for causing a processor to execute the operations of the one or more constituent elements) to execute the program. As another example, a program for causing a processor to function as the one or more constituent elements may be installed in the wireless access point 950, and the wireless communication interface 963 and/or the controller 951 may execute the program. As described above, the wireless access point 950 or the module may be provided as a device provided with the one or more constituent elements, and a program for causing a processor to function as the one or more constituent elements may be provided. In addition, a readable storage medium in which the program is stored may be provided.

In addition, in the wireless access point 950 shown in FIG. 19, for example, the wireless communication unit 220 described with reference to FIG. 11 may be implemented by the wireless communication interface 963. In addition, the antenna unit 210 may be implemented by the antenna 965. Furthermore, the network communication unit 230 may be implemented by the controller 951 and/or the network interface 957.

7. <<Conclusion>>

Devices and processes according to embodiments of the present disclosure have been described above with reference to FIGS. 1 to 19.

According to the embodiments of the present disclosure, the base station 100 is provided with the information acquisition unit 153 which acquires measurement information of a frequency band (i.e., a shared band) shared between a cellular system and a wireless LAN which is the measurement information provided by an access point of the wireless LAN, and the communication control unit 155 which decides the time for which the frequency band (i.e., the shared band) is occupied for the cellular system based on the measurement information.

Accordingly, for example, it is possible to suppress a decrease in occasions on which the shared band can be used in the wireless LAN. More specifically, for example, the time for which the shared band is occupied is decided in consideration of a state of wireless LAN communication in surrounding environments. Thus, when the shared band is frequently used in the wireless LAN, as an example, occupying the shared band for a short time for the cellular system is decided, and when the shared band is not used much in the wireless LAN, occupying the shared band for a long time for the cellular system is decided. As a result, it is possible to suppress a decrease in occasions on which the shared band can be used in the wireless LAN.

In addition, according to the embodiments of the present disclosure, the access point 200 is provided with the information acquisition unit 253 which acquires the measurement information of the frequency band (i.e., the shared band) shared between the cellular system and the wireless LAN which is the measurement information generated by a wireless LAN device, and the information providing unit 255 which provides the measurement information to a base station of the cellular system.

Accordingly, for example, the base station of the cellular system (i.e., the base station 100) can ascertain states of wireless LAN communication in surrounding environments.

The preferred embodiments of the present disclosure have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Although the example in which the measurement information provided by the access point of the wireless LAN is, for example, a report complying with IEEE 802.11k or information generated based on the report has been described, the present disclosure is not limited thereto. The measurement information may be, for example, a report complying with the amended standard of IEEE 802.11k or information generated based on the report. Alternatively, the measurement information may be measurement information of another type.

Although an example in which the cellular system is a system that is compliant with LTE, LTE-Advanced, or a communication scheme that conforms to them is described, the present disclosure is not limited to such an example. For example, the cellular system may be a system that conforms to another communication standard.

Processing steps in the processing described herein do not necessarily have to be performed in the chronological order described in the flowcharts or sequence diagrams. For example, the processing steps in the processing may be performed in order different from the order described as the flowcharts or sequence diagrams, or may be performed in parallel.

In addition, a computer program for causing a processor (for example, a CPU, a DSP, or the like) provided in a base station of the present specification to function as constituent elements of the base station (for example, a requesting unit, an information acquisition unit, and/or a communication control unit) (in other words, a computer program for causing the processor to execute the operations of the constituent elements of the base station 100) can also be produced. In addition, a storage medium storing the computer program may also be provided. Furthermore, a device provided with a memory storing the computer program and one or more processors that can execute the computer program (for example, a finished product, a module for a finished product (a part, a processing circuit, a chip, or the like)) may also be provided. In addition, a method including the operations of the constituent elements (for example, the requesting unit, the information acquisition unit, and/or the communication control unit) of the base station 100 also belongs to the technology of the present disclosure. Note that it can be said that the same matters as those of the base station and the constituent elements of the base station are applied to the access point of the present specification and the constituent elements (for example, the measurement requesting unit, the information acquisition unit, and/or the information providing unit) of the access point.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

A device including:

an acquisition unit configured to acquire measurement information of a frequency band shared between a cellular system and a wireless local area network (LAN), the measurement information being provided by an access point of the wireless LAN; and a control unit configured to decide a time for which the frequency band is occupied for the cellular system based on the measurement information.

(2)

The device according to (1), further including:

a requesting unit configured to request the measurement information from the access point.

(3)

The device according to (2), wherein the access point is an access point selected based on reception power of one or more received beacons.

(4)

The device according to any one of (1) to (3), wherein the measurement information is a report complying with IEEE 802.11k or information generated based on the report.

(5)

The device according to (4), wherein the access point is an access point that transmits a beacon including a radio resource management (RRM) capability information element (IE).

(6)

The device according to any one of (1) to (5), wherein the control unit decides the time for which the frequency band is occupied for the cellular system based on a reception state of a beacon transmitted from the access point of the wireless LAN.

(7)

The device according to (6), wherein, when a predetermined condition for the reception state is satisfied, the control unit decides to occupy the frequency band for a longer time than when the predetermined condition is not satisfied.

(8)

The device according to (6) or (7), wherein, when a predetermined condition for the reception state is not satisfied, the control unit decides the time for which the frequency band is occupied for the cellular system based on the measurement information.

(9)

The device according to any one of (6) to (8), wherein, when a predetermined condition for the reception state is not satisfied and the measurement information is not provided, the control unit decides not to occupy the frequency band for the cellular system.

(10)

The device according to any one of (6) to (8), wherein, when a predetermined condition for the reception state is not satisfied and the measurement information is not provided, the control unit decides the time for which the frequency band is occupied for the cellular system based on a reception state of a predetermined frame complying with a wireless LAN standard in the frequency band.

(11)

The device according to any one of (7) to (10), wherein the predetermined condition is that reception power of all beacons transmitted from the access point of the wireless LAN is less than a predetermined threshold value or that reception power of all beacons transmitted from the access point of the wireless LAN is equal to or lower than the predetermined threshold value.

(12)

The device according to any one of (1) to (11), wherein the control unit decides a timing at which the frequency band is occupied for the cellular system based on a state of buffering of the access point of the wireless LAN.

(13)

The device according to any one of (1) to (12), wherein the control unit decides an occupancy time of the frequency band for the cellular system.

(14)

The device according to any one of (1) to (12), wherein the control unit decides a time occupancy rate of the frequency band for the cellular system.

(15)

The device according to any one of (1) to (14), wherein the frequency band is a channel of the wireless LAN.

(16)

The device according to any one of (1) to (15), wherein the device is a base station of the cellular system, a base station device for the base station, or a module for the base station device.

(17)

A method including:

acquiring measurement information of a frequency band shared between a cellular system and a wireless LAN, the measurement information being provided by an access point of the wireless LAN; and deciding, by a processor, a time for which the frequency band is occupied for the cellular system based on the measurement information.

(18)

A device including:

an acquisition unit configured to acquire measurement information of a frequency band shared between a cellular system and a wireless LAN, the measurement information being generated by a wireless LAN device; and a providing unit configured to provide the measurement information to a base station of the cellular system.

(19)

The device according to (18), wherein the device is an access point of the wireless LAN or a module for the access point.

(20)
A method including:
acquiring measurement information of a frequency band shared between a cellular system and a wireless LAN, the measurement information being generated by a wireless LAN device; and
providing, by a processor, the measurement information to a base station of the cellular system.
(21)
A program for causing a processor to execute:
acquiring measurement information of a frequency band shared between a cellular system and a wireless LAN, the measurement information being provided by an access point of the wireless LAN; and
deciding a time for which the frequency band is occupied for the cellular system based on the measurement information.
(22)
A readable recording medium having a program recorded thereon, the program causing a processor to execute:
acquiring measurement information of a frequency band shared between a cellular system and a wireless LAN, the measurement information being provided by an access point of the wireless LAN; and
deciding a time for which the frequency band is occupied for the cellular system based on the measurement information.
(23)
A program for causing a processor to execute:
acquiring measurement information of a frequency band shared between a cellular system and a wireless LAN, the measurement information being generated by a wireless LAN device; and
providing the measurement information to a base station of the cellular system.
(24)
A readable recording medium having a program recorded thereon, the program causing a processor to execute:
acquiring measurement information of a frequency band shared between a cellular system and a wireless LAN, the measurement information being generated by a wireless LAN device; and
providing the measurement information to a base station of the cellular system.

REFERENCE SIGNS LIST 1 communication system
10 cell
30 cellular terminal
40 wireless LAN terminal
100 base station
151 requesting unit
153 information acquisition unit
155 communication control unit
200 access point
251 measurement requesting unit
253 information acquisition unit
255 communication providing unit

The invention claimed is:
1. A device comprising:
processing circuitry configured to:
acquire measurement information of a frequency band shared between a cellular system and a wireless local area network (LAN), the measurement information being provided by an access point of the wireless LAN; and
decide a time for which the frequency band is occupied for the cellular system based on the measurement information by comparing reception power of all beacons transmitted from the access point of the wireless LAN with a predetermined threshold value, and
wherein when the reception power of all beacons is less than the predetermined threshold value or that reception power of all beacons is equal to or lower than the predetermined threshold value, the processing circuitry decides to occupy the frequency band for a longer time than when the predetermined condition is not satisfied.
2. The device according to claim 1,
wherein the processing circuitry is configured to request the measurement information from the access point.
3. The device according to claim 2, wherein the access point is an access point selected based on reception power of one or more received beacons.
4. The device according to claim 1, wherein the measurement information is a report complying with IEEE 802.11k or information generated based on the report.
5. The device according to claim 4, wherein the access point is an access point that transmits a beacon including a radio resource management (RRM) capability information element (IE).
6. The device according to claim 1, wherein the processing circuitry decides a timing at which the frequency band is occupied for the cellular system based on a state of buffering of the access point of the wireless LAN.
7. The device according to claim 1, wherein the processing circuitry decides an occupancy time of the frequency band for the cellular system.
8. The device according to claim 1, wherein the processing circuitry decides a time occupancy rate of the frequency band for the cellular system.
9. The device according to claim 1, wherein the frequency band is a channel of the wireless LAN.
10. The device according to claim 1, wherein the device is a base station of the cellular system, a base station device for the base station, or a module for the base station device.
11. A device comprising:
processing circuitry configured to
acquire measurement information of a frequency band shared between a cellular system and a wireless local area network (LAN), the measurement information being provided by an access point of the wireless LAN; and
decide a time for which the frequency band is occupied for the cellular system based on the measurement information, wherein
the processing circuitry decides the time for which the frequency band is occupied for the cellular system based on a reception state of a beacon transmitted from the access point of the wireless LAN, and
when a predetermined condition for the reception state is satisfied, the processing circuitry decides to occupy the frequency band for a longer time than when the predetermined condition is not satisfied.
12. A device comprising:
processing circuitry configured to
acquire measurement information of a frequency band shared between a cellular system and a wireless local area network (LAN), the measurement information being provided by an access point of the wireless LAN; and
decide a time for which the frequency band is occupied for the cellular system based on the measurement information, wherein the processing circuitry decides the time for which the frequency band is occupied for the cellular system based on a reception state of a beacon transmitted from the access point of the wireless LAN, and when a predetermined condition for the reception state is not satisfied, the processing circuitry decides the time for which the frequency band is occupied for the cellular system based on the measurement information.

13. A device comprising:
processing circuitry configured to
   acquire measurement information of a frequency band shared between a cellular system and a wireless local area network (LAN), the measurement information being provided by an access point of the wireless LAN; and
   decide a time for which the frequency band is occupied for the cellular system based on the measurement information, wherein
the processing circuitry decides the time for which the frequency band is occupied for the cellular system based on a reception state of a beacon transmitted from the access point of the wireless LAN, and
when a predetermined condition for the reception state is not satisfied and the measurement information is not provided, the processing circuitry decides not to occupy the frequency band for the cellular system.

14. A device comprising:
processing circuitry configured to
   acquire measurement information of a frequency band shared between a cellular system and a wireless local area network (LAN), the measurement information being provided by an access point of the wireless LAN; and
   decide a time for which the frequency band is occupied for the cellular system based on the measurement information, wherein
the processing circuitry decides the time for which the frequency band is occupied for the cellular system based on a reception state of a beacon transmitted from the access point of the wireless LAN, and
when a predetermined condition for the reception state is not satisfied and the measurement information is not provided, the processing circuitry decides the time for which the frequency band is occupied for the cellular system based on a reception state of a predetermined frame complying with a wireless LAN standard in the frequency band.

15. A method comprising:
acquiring measurement information of a frequency band shared between a cellular system and a wireless LAN, the measurement information being provided by an access point of the wireless LAN; and deciding, using processing circuitry, a time for which the frequency band is occupied for the cellular system based on the measurement information by comparing reception power of all beacons transmitted from the access point of the wireless LAN with a predetermined threshold value, and wherein when the reception power of all beacons is less than the predetermined threshold value or that reception power of all beacons is equal to or lower than the predetermined threshold value, the processing circuitry decides to occupy the frequency band for a longer time than when the predetermined condition is not satisfied.

\* \* \* \* \*